(12) United States Patent  (10) Patent No.: US 10,554,002 B2
Okazaki et al.  (45) Date of Patent: Feb. 4, 2020

(54) ELECTRIC CONDUCTION APPARATUS

(71) Applicant: NINTENDO CO., LTD., Kyoto (JP)

(72) Inventors: Yuya Okazaki, Kyoto (JP); Shinji Hirose, Kyoto (JP); Hiroki Ikuta, Kyoto (JP)

(73) Assignee: Nintendo Co., Ltd., Kyoto (JP)

(*) Notice: Subject to any disclaimer, the term of this patent is extended or adjusted under 35 U.S.C. 154(b) by 0 days.

(21) Appl. No.: 16/201,091

(22) Filed: Nov. 27, 2018

(65) Prior Publication Data

US 2019/0273350 A1 Sep. 5, 2019

(30) Foreign Application Priority Data

Mar. 2, 2018 (JP) ................................. 2018-037582

(51) Int. Cl.
*H01R 33/94* (2006.01)
*H02J 7/00* (2006.01)
*H01R 13/516* (2006.01)

(52) U.S. Cl.
CPC ........... *H01R 33/94* (2013.01); *H01R 13/516* (2013.01); *H02J 7/0045* (2013.01)

(58) Field of Classification Search
CPC .................................................. H01R 13/6315
See application file for complete search history.

(56) References Cited

U.S. PATENT DOCUMENTS

| | | | | |
|---|---|---|---|---|
| 6,113,409 A * | 9/2000 | Park | ................. | H01R 13/62933 439/136 |
| 6,193,546 B1 * | 2/2001 | Sadler | ....................... | A45F 5/02 439/165 |
| 6,366,450 B1 * | 4/2002 | Janicek | ................. | G06F 1/1632 345/905 |
| 6,716,058 B2 * | 4/2004 | Youn | ..................... | G06F 1/1632 439/165 |
| 7,014,486 B1 * | 3/2006 | Wu | ........................ | G06F 1/1632 439/165 |
| 7,059,882 B2 * | 6/2006 | Sugita | ................ | H01R 13/6315 439/247 |

(Continued)

FOREIGN PATENT DOCUMENTS

JP  2000-134808  5/2000
JP  2010-166436  7/2010

(Continued)

OTHER PUBLICATIONS

Office Action dated Jan. 8, 2019 issued in Japanese Application No. 2018-037582 (4 pgs.).

(Continued)

*Primary Examiner* — Ross N Gushi

(74) *Attorney, Agent, or Firm* — Nixon & Vanderhye PC

(57) ABSTRACT

This electric conduction apparatus is an electric conduction apparatus that supports an electronic device having a predetermined surface provided with a connector insertion port and is capable of being electrically connected to the electronic device, the electric conduction apparatus including a housing having a front side and a rear side, a connector that protrudes from the housing and can be inserted into the connector insertion port, and a pivoting mechanism configured to pivot the connector about a first axis line located on the rear side relative to the connector.

20 Claims, 32 Drawing Sheets

(56) References Cited

U.S. PATENT DOCUMENTS

| | | | |
|---|---|---|---|
| 7,066,752 B2* | 6/2006 | Hsu | H01R 13/62905 439/248 |
| 7,090,521 B2* | 8/2006 | Nishio | H01R 13/6315 439/248 |
| 7,311,541 B2* | 12/2007 | Chien | H01R 13/748 439/246 |
| 7,467,961 B2* | 12/2008 | Kuo | H01R 13/6315 439/248 |
| 7,538,792 B2* | 5/2009 | Takahashi | H04N 1/00204 348/207.1 |
| 7,628,628 B2* | 12/2009 | Matsuda | H01R 13/6315 439/247 |
| 7,719,830 B2* | 5/2010 | Howarth | G06F 1/1632 312/223.2 |
| 7,929,291 B2* | 4/2011 | Park | G06F 1/1632 361/679.41 |
| 7,931,494 B2* | 4/2011 | Long | H01R 13/6315 439/527 |
| 7,933,117 B2* | 4/2011 | Howarth | G06F 1/1632 248/917 |
| 7,956,577 B2* | 6/2011 | Fujii | H02J 7/0044 320/114 |
| 8,007,309 B2* | 8/2011 | Fan | H01R 13/74 439/376 |
| 8,113,873 B1* | 2/2012 | Sarraf | H01R 13/6315 439/533 |
| 8,152,561 B2* | 4/2012 | Long | H01R 13/6315 439/527 |
| 8,223,483 B2* | 7/2012 | Hayashida | G06F 1/1632 361/679.41 |
| 8,482,252 B2* | 7/2013 | Byrne | G11B 33/122 320/113 |
| 8,535,102 B1* | 9/2013 | Colahan | H01R 31/06 439/5 |
| 8,545,247 B2* | 10/2013 | Aldana | H01R 13/6315 439/248 |
| 8,559,172 B2* | 10/2013 | Byrne | G06F 1/1632 361/679.41 |
| 8,582,289 B2* | 11/2013 | Zhou | F16M 13/00 361/679.41 |
| 8,634,883 B2* | 1/2014 | Hong | H01R 13/60 455/575.1 |
| 8,644,018 B2* | 2/2014 | Hung | G06F 1/1632 16/302 |
| 8,721,356 B2* | 5/2014 | Webb | G06F 1/1632 439/248 |
| 8,780,547 B2* | 7/2014 | Nakanishi | G03B 29/00 353/119 |
| 8,821,173 B2* | 9/2014 | Carnevali | G06F 1/1632 361/679.41 |
| 8,853,998 B2* | 10/2014 | Aldana | G06F 1/1632 320/107 |
| 8,929,065 B2* | 1/2015 | Williams | G06F 1/1632 361/679.41 |
| 8,986,029 B2* | 3/2015 | Webb | H05K 7/14 174/135 |
| 9,007,169 B2* | 4/2015 | Lee | G06F 1/1632 320/111 |
| 9,075,573 B2* | 7/2015 | Hayashida | G06F 1/1632 |
| 9,093,849 B2* | 7/2015 | Carreon | H04M 1/04 |
| 9,103,484 B2* | 8/2015 | Hayashi | F16M 13/00 |
| 9,118,749 B2* | 8/2015 | Kim | H04M 1/0254 |
| 9,160,124 B2* | 10/2015 | Colahan | H01R 31/06 |
| 9,178,299 B2* | 11/2015 | Alexia | H01R 13/44 |
| 9,201,453 B2* | 12/2015 | Stanley | G06F 1/1626 |
| 9,261,919 B2* | 2/2016 | Webb | G06F 1/1632 |
| 9,318,906 B2* | 4/2016 | Kim | H04M 1/04 |
| 9,429,995 B2* | 8/2016 | Byrne | G06F 1/1632 |
| 9,454,183 B2* | 9/2016 | Suckle | G06F 1/1632 |
| 9,466,927 B2* | 10/2016 | Ardisana, II | G06F 1/1632 |
| 9,509,087 B2* | 11/2016 | Hong | H01R 13/60 |
| 9,698,613 B2* | 7/2017 | Koshiishi | H02J 7/0047 |
| 9,742,107 B2* | 8/2017 | Choi | H01R 13/5829 |
| 9,778,690 B2* | 10/2017 | Ardisana, II | G06F 1/1632 |
| 9,829,918 B2* | 11/2017 | Suckle | G06F 1/1632 |
| 9,836,086 B2* | 12/2017 | Suckle | G06F 1/1632 |
| 9,874,902 B2* | 1/2018 | McCracken | G06F 1/1632 |
| 10,092,829 B2* | 10/2018 | Ikuta | A63F 13/20 |
| 10,120,414 B2* | 11/2018 | Ardisana, II | G06F 1/1632 |
| 10,209,740 B2* | 2/2019 | Vroom | G06F 1/1632 |
| 10,258,879 B2* | 4/2019 | Iwao | A63F 13/23 |
| 2006/0035500 A1* | 2/2006 | Sugita | H01R 13/6315 439/247 |
| 2006/0250764 A1* | 11/2006 | Howarth | G06F 1/1632 361/679.41 |
| 2007/0047198 A1* | 3/2007 | Crooijmans | G06F 1/1632 361/679.41 |
| 2008/0037767 A1 | 2/2008 | Gullickson et al. | |
| 2008/0164845 A1* | 7/2008 | Choi | H02J 7/0044 320/115 |
| 2008/0259550 A1* | 10/2008 | Lien | B60R 11/0211 361/679.02 |
| 2009/0009957 A1* | 1/2009 | Crooijmans | G06F 1/1632 361/679.41 |
| 2009/0129010 A1* | 5/2009 | Park | G06F 1/1632 361/679.56 |
| 2010/0158297 A1* | 6/2010 | Stuczynski | G06F 1/1632 381/332 |
| 2011/0095724 A1* | 4/2011 | Byrne | G11B 33/122 320/115 |
| 2011/0098087 A1* | 4/2011 | Tseng | G01C 21/265 455/557 |
| 2011/0117833 A1* | 5/2011 | Hong | G06F 1/1632 455/3.06 |
| 2011/0164375 A1* | 7/2011 | Hayashida | G06F 1/1632 361/679.41 |
| 2012/0045931 A1* | 2/2012 | Carnevali | G06F 1/1632 439/544 |
| 2012/0045932 A1* | 2/2012 | Carnevali | G06F 1/1632 439/552 |
| 2012/0206875 A1* | 8/2012 | Carnevali | G06F 1/1632 361/679.41 |
| 2012/0264329 A1* | 10/2012 | Hayashida | G06F 1/1632 439/529 |
| 2013/0002193 A1* | 1/2013 | Aldana | G06F 1/1632 320/107 |
| 2013/0005179 A1* | 1/2013 | Aldana | G06F 1/1632 439/529 |
| 2013/0016463 A1* | 1/2013 | Hiramoto | H01R 13/516 361/679.01 |
| 2013/0058036 A1* | 3/2013 | Holzer | G06F 1/1632 361/679.44 |
| 2013/0163186 A1* | 6/2013 | Mizusawa | H05K 7/14 361/679.41 |
| 2013/0170131 A1* | 7/2013 | Yen | G06F 1/1632 361/679.44 |
| 2013/0217448 A1* | 8/2013 | Kim | H04M 1/0254 455/575.1 |
| 2013/0241470 A1* | 9/2013 | Kim | H04M 1/04 320/107 |
| 2014/0069710 A1* | 3/2014 | Webb | H05K 7/14 174/549 |
| 2014/0118923 A1* | 5/2014 | Stanley | G06F 1/1626 361/679.41 |
| 2014/0307383 A1* | 10/2014 | Webb | G06F 1/1632 361/679.44 |
| 2015/0036283 A1* | 2/2015 | Suckle | G06F 1/1632 361/679.43 |
| 2016/0069507 A1* | 3/2016 | Ardisana, II | G06F 1/1632 248/548 |
| 2016/0361640 A1* | 12/2016 | Iwao | A63F 13/23 |
| 2016/0361641 A1* | 12/2016 | Koizumi | G06F 1/1684 |
| 2017/0117729 A1* | 4/2017 | Hirose | H01R 13/629 |
| 2017/0136353 A1* | 5/2017 | Koizumi | G06F 1/1684 |
| 2017/0282061 A1* | 10/2017 | Fujita | A63F 13/23 |
| 2018/0099218 A1* | 4/2018 | Ikuta | A63F 13/20 |

(56) References Cited

U.S. PATENT DOCUMENTS

2018/0151982 A1* 5/2018 Hirose ................. H01R 13/629
2018/0326298 A1* 11/2018 Ikuta ....................... A63F 13/20

FOREIGN PATENT DOCUMENTS

| JP | 2013-25885 | 2/2013 |
| JP | 2017-85743 | 5/2017 |

OTHER PUBLICATIONS

Partial European Search Report dated Jun. 17, 2019 in corresponding European Application No. 18211105.4, 14 pages.

* cited by examiner

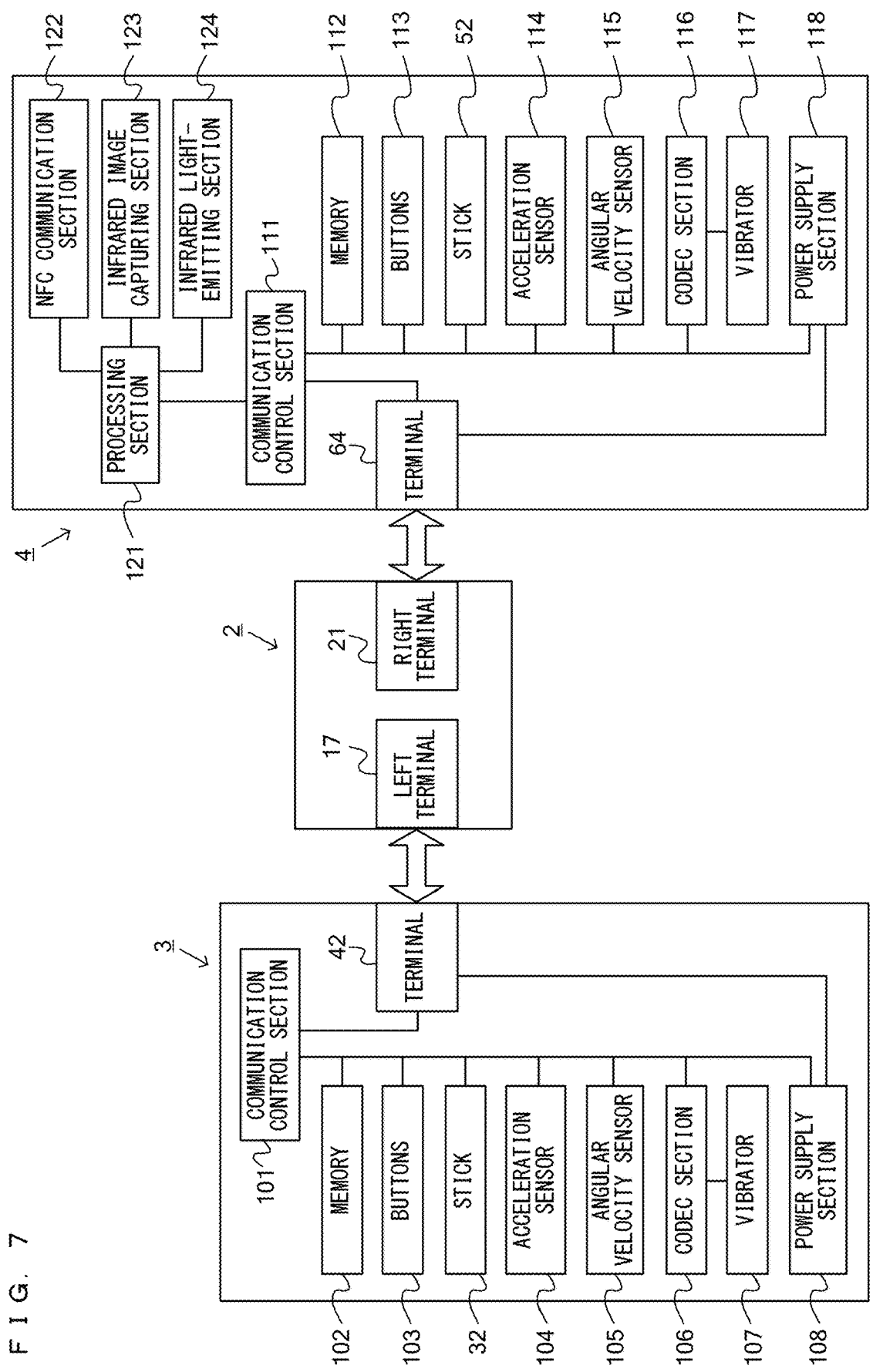
F I G. 7

ELECTRIC CONDUCTION APPARATUS

This application claims priority to JP Patent Application No. 2018-037582 filed Mar. 2, 2018, the entire contents of which are hereby incorporated by reference.

TECHNICAL FIELD

The present disclosure relates to an electric conduction apparatus that supports an electronic device having a predetermined surface provided with a connector insertion port and is capable of being electrically connected to this electronic device.

BACKGROUND ART

A portable game system is configured to be supported by an electric conduction apparatus called a cradle such as that disclosed in JP 2017-85743A, for example. This cradle has a connector protruding upward, and power is supplied by inserting this connector into a connector insertion portion formed in a lower surface of the game system.

JP 2017-85743A is an example of related art.

SUMMARY OF THE INVENTION

Incidentally, in order to detach the game system from the electric conduction apparatus in a state where the connector is inserted into the connector insertion port, the game apparatus may be pulled up in parallel to the direction in which the connector is inserted. However, if the game system can be detached from the electric conduction apparatus by being tilted forward, for example, there is also a possibility that an unnecessary load will be applied to the connector. It should be noted that such a problem is not limited to the game system, but also arises in various electronic devices configured to be electrically connected via the electric conduction apparatus and the connector.

The present disclosure was made in order to solve this problem, and an object of the present disclosure is to provide an electric conduction apparatus capable of reducing the possibility that an unnecessary load will be applied to a connector.

This electric conduction apparatus is an electric conduction apparatus that supports an electronic device having a predetermined surface provided with a connector insertion port and is capable of being electrically connected to the electronic device, the electric conduction apparatus including a housing having a front side and a rear side, a connector that protrudes from the housing and is configured to be inserted into the connector insertion port, and a pivoting mechanism configured to pivot the connector about a first axis line located on the rear side relative to the connector.

It should be noted that the front side and the rear side are set based on the housing, and even if the housing is disposed tilted, their positional relationship will not change.

With this configuration, the connector is supported to be pivotable about the first axis line located on the rear side relative to the connector. Thus, for example, if a user attempts to detach the electronic device from the electric conduction apparatus while tilting the electronic device forward in a state where the connector is inserted into the connector insertion port, the connector pivots when the electronic device is tilted. Then, the connector moves downward (that is, the direction opposite to the direction in which the connector is inserted) while being tilted forward together with the electronic device in a process in which the connector pivots, and thus the connector separates from the connector insertion port. Thus, even in the case where the electronic device is detached by tilting the electronic device forward, it is possible to reduce the possibility that an unnecessary load will be applied to the connector.

In the electric conduction apparatus, the pivoting mechanism may further include a facing surface that faces a back surface of the electronic device that extends from a rear end of the predetermined surface when the connector is inserted into the connection insertion port of the electronic device, and the facing surface may be disposed on the rear side relative to the connector, and extend substantially parallel to a direction in which the connector protrudes.

Because this configuration makes it possible to bring the facing surface into contact with the electronic device when the connector is inserted into the connector insertion port, this makes it possible to restrict the pivoting of the connector. Thus, the connector can be smoothly inserted into the connector insertion port.

Also, in the electric conduction apparatus, the facing surface may be configured to be pivotable together with the connector by the pivoting mechanism.

According to this configuration, even if the connector pivots, for example, the facing surface pivots together with the connector, and thus the positional relationship between the connector and the facing surface does not change. Thus, if the electronic device is moved using the facing surface as a reference, the connector can be easily inserted into the connector insertion port.

It should be noted that "substantially parallel" may not be "completely parallel", and need only be "parallel to an extent that the connector can be smoothly inserted into the connector insertion port".

If the electronic device includes a recessed portion that extends upward from a portion at which the predetermined surface and the back surface intersect with each other, the pivoting mechanism may have various configurations. For example, the pivoting mechanism may be configured to include a guide portion at least a portion of which can be inserted into the recessed portion, the guide portion having the facing surface.

By bringing a pair of predetermined surfaces of the guide portion into contact with two side surfaces of the recessed portion of the electronic device, the position of the electronic device in a direction along the first axis line can be easily determined when the connector is inserted.

Alternatively, the pivoting mechanism may have a guide portion at least a portion of which can be inserted into the recessed portion, the guide portion protruding from the facing surface to the front side.

With this configuration, by bringing a pair of predetermined surfaces of the guide portion into contact with two side surfaces of the recessed portion of the electronic device, the position of the electronic device in a direction along the first axis line can be also easily determined when the connector is inserted.

The electric conduction apparatus may further include a substrate configured to supply power to the connector and a cable extending from a rear end portion of the substrate on the rear side, in which the substrate may be configured to be supported to be pivotable together with the connector by the pivoting mechanism, and the first axis line may be located in a vicinity of the rear end portion of the substrate.

According to this configuration, the cable extends from the rear end portion of the substrate that supplies power to the connector, and the first axis line is located in the vicinity of the rear end portion of the substrate. That is, because the first axis line is located near the portion at which the connector and the cable are connected to each other, even if the substrate pivots together with the connector, the portion at which the substrate and the cable are connected to each other is unlikely to move. Thus, it is possible to reduce the possibility that an unnecessary load will be applied due to excessive movement of the cable.

In the electric conduction apparatus, the pivoting mechanism may include an elastic member configured to bias the connector in a direction in which the connector is inserted into the connector insertion port.

Accordingly, the connector is always pressed in the direction in which the connector is inserted, and thus the connector can be biased to the position at which the connector can be easily inserted into the connector insertion port.

In the electric conduction apparatus, the electronic device may have a front surface extending from a front end of the predetermined surface, the housing may have a support surface that faces the predetermined surface of the electronic device, the support surface may be configured such that a portion at which the predetermined surface and the front surface of the electronic device intersect with each other can come into contact with the support surface when the connector inserted into the connector insertion port is detached from the connector insertion port.

According to this configuration, when the electronic device is detached by being tilted forward, the intersecting portion of the electronic device comes into contact with the support surface of the housing, and thus this contact portion serves as the fulcrum and the electronic device can be stably pivoted forward. Thus, the connector also smoothly pivots along with this stable pivoting, and thus it is possible to easily separate the connector from the connector insertion port.

In the electric conduction apparatus, the housing may have a base portion having a surface that faces the predetermined surface of the electronic device and an extension portion having a front surface that extends from the surface of the base portion, the base portion and the extension portion may be configured to intersect with each other in a side view, and the connector may be disposed on the housing side relative to a virtual plane that connects a front end of the surface of the base portion and an upper end of the front surface.

According to this configuration, if the electric conduction apparatus is disposed such that the front end of the surface of the base portion and the upper end of the front surface are in contact with the installation surface, the connector is not in contact with the installation surface. Thus, even if the electric conduction apparatus is disposed in such a manner, it is possible to reduce the possibility that the connector will come into contact with the installation surface and be damaged. It should be noted that the base portion and the extension portion may be configured to have an L-shape in a side view, for example.

In the electric conduction apparatus, the housing may have a base portion having a surface that faces the predetermined surface of the electronic device and an extension portion that has a front surface extending from the surface of the base portion and a back surface that is opposite to the front surface, and the electric conduction apparatus may further include a stand member that is attached to a back surface of the extension portion, and a linking mechanism configured to link the stand member to the housing so as to be capable of pivoting about a second axis line, the linking mechanism being capable of adjusting an angle between the stand member and the housing.

Accordingly, it is possible to adjust the angle of the stand member with respect to the housing and to install the housing at an angle desired by a user.

In the electric conduction apparatus, the linking mechanism may be configured to detachably link the stand member and the housing together, and separate the stand member from the housing when the angle between the stand member and the housing is a predetermined angle or more.

According to this configuration, when the angle of the stand member with respect to the housing is forcibly increased, for example, if the angle is the predetermined angle or more, the stand member separates from the housing, and thus it is possible to reduce the possibility that the stand member and the housing will be damaged.

In the electric conduction apparatus, the stand member may be configured such that a site of the housing that is located above the second axis line comes into contact with the housing when the angle between the stand member and the housing is the predetermined angle.

With this configuration, if the angle of the stand member with respect to the housing is increased to a predetermined angle or more, the site of the stand member comes into contact with the housing, this contact point serves as the fulcrum, and the stand member can be easily separated from the housing.

In the electric conduction apparatus, the linking mechanism may include a linking portion provided in the housing and a pair of fixing portions that are provided in the stand member and detachably fixed to the linking portion so as to sandwich two ends of the linking portion in a direction along the second axis line.

According to this configuration, it is possible to smoothly separate the stand member from the housing and to reduce the possibility that the linking mechanism such as the fixing portions will be damaged at the time of separation.

In the electric conduction apparatus, the linking mechanism may further include an engagement portion that is provided between the pair of fixing portions of the stand member and can engage with the linking portion.

If such an engagement portion is provided in addition to the fixing portions being fixed to the linking portion, the stand member and the housing can be more tightly linked together.

In the electric conduction apparatus, an inclined portion may be formed in at least one of portions at which the fixing portions and the linking portion are in contact with each other in a state where the fixing portions and the linking portion are fixed to each other, and the fixing portions and the linking portion may be configured to be fixed after sliding over the inclined surface.

According to this configuration, the fixing portions can be fixed by sliding over the inclined portion of the linking portion, and thus the fixing portions can be easily attached to the linking portion.

In the electric conduction apparatus, the linking mechanism may include a first site that is provided in the extension portion, a second site that has the linking portion, and a hinge portion that links the first site and the second site and enables the first site and the second site to pivot relative to each other about the second axis line.

Although this configuration is one example of the linking mechanism, by using, as a hinge portion, a member that requires torque for pivoting of a torque hinge or the like, the force required for pivoting can be increased by the torque portion when the stand member is pivoted, for example. As a result, the angle of the stand member with respect to the housing can be adjusted steplessly, and the angle at which the housing is installed can be finely adjusted.

In the electric conduction apparatus, a material for forming the first site and the second site may have a rigidity that is higher than that of a material for forming the housing.

According to this configuration, it is possible to increase the rigidity of the first and second sites that are linked by the hinge portion, and to reduce the possibility that the first and second sites will be damaged even if force is repeatedly applied due to the stand member pivoting.

Although there is no particular limitation on the material for constituting the first and second sites, the first and second sites may be made of a resin material containing glass fibers, and in this case, at least a portion of the first and second sites may be accommodated in the housing.

The resin material including glass fibers has high strength, but it is difficult to color the resin material to a desired color in some cases. Thus, there is a possibility that the aesthetic appearance of the first and second sites cannot be increased, and thus by housing at least portions of these sites in the housing, it will be difficult to see these sites from the outside.

The electric conduction apparatus may be configured such that the electronic device can be charged when the connector is inserted into the connector insertion port of the electronic device.

According to the electric conduction apparatus, it is possible to reduce the possibility that an unnecessary load will be applied to the connector.

BRIEF DESCRIPTION OF THE DRAWINGS

FIG. 7 is a block diagram showing an example of the internal configuration of the main body apparatus, the left controller, and the right controller shown in FIG. 1.

EMBODIMENTS OF THE INVENTION

The following describes an exemplary embodiment in a case where an electric conduction apparatus according to the present disclosure is applied to a charging device of a game system. Hereinafter, first, the game system that is to be charged will be described, and then, the electric conduction apparatus will be described.

1. Summary of Game System

A game system according to an example of an exemplary embodiment is described below. An example of a game system 1 according to the exemplary embodiment includes a main body apparatus (an information processing apparatus; which functions as a game apparatus main body in the exemplary embodiment) 2, a left controller 3, and a right controller 4. Each of the left controller 3 and the right controller 4 is attachable to and detachable from the main body apparatus 2. That is, the game system 1 can be used as a unified apparatus obtained by attaching each of the left controller 3 and the right controller 4 to the main body apparatus 2. Further, in the game system 1, the main body apparatus 2, the left controller 3, and the right controller 4 can also be used as separate bodies (see FIG. 2). Hereinafter, first, the hardware configuration of the game system 1 according to the exemplary embodiment is described, and then, the control of the game system 1 according to the exemplary embodiment is described.

1-1. Main Body Apparatus

Figure 1:
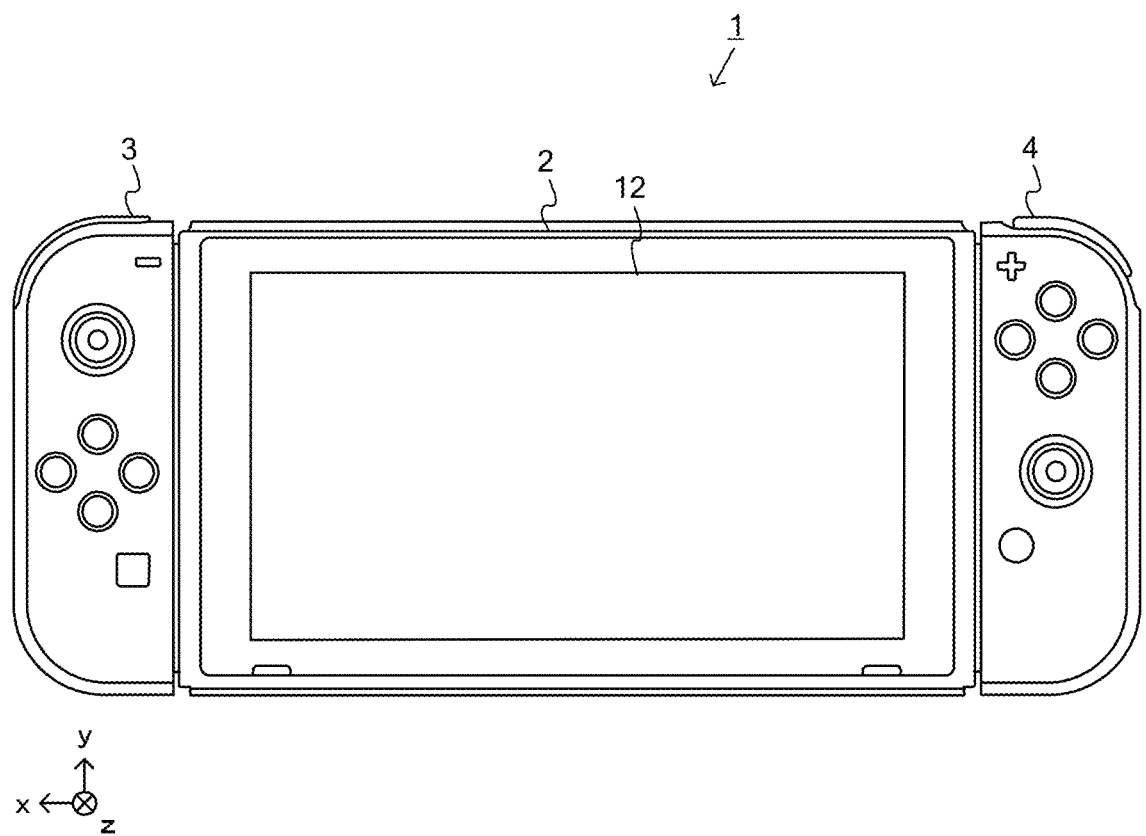
FIG. 1 is a diagram showing an example of a game system in which a left controller and a right controller are attached to a main body apparatus.

FIG. 1 is a diagram showing an example of the state where the left controller 3 and the right controller 4 are attached to the main body apparatus 2. As shown in FIG. 1, each of the left controller 3 and the right controller 4 is attached to and unified with the main body apparatus 2. The main body apparatus 2 is an apparatus for performing various processes (e.g., game processing) in the game system 1. The main body apparatus 2 includes a display 12. Each of the left controller 3 and the right controller 4 is an apparatus including operation sections with which a user provides inputs.

Figure 2:
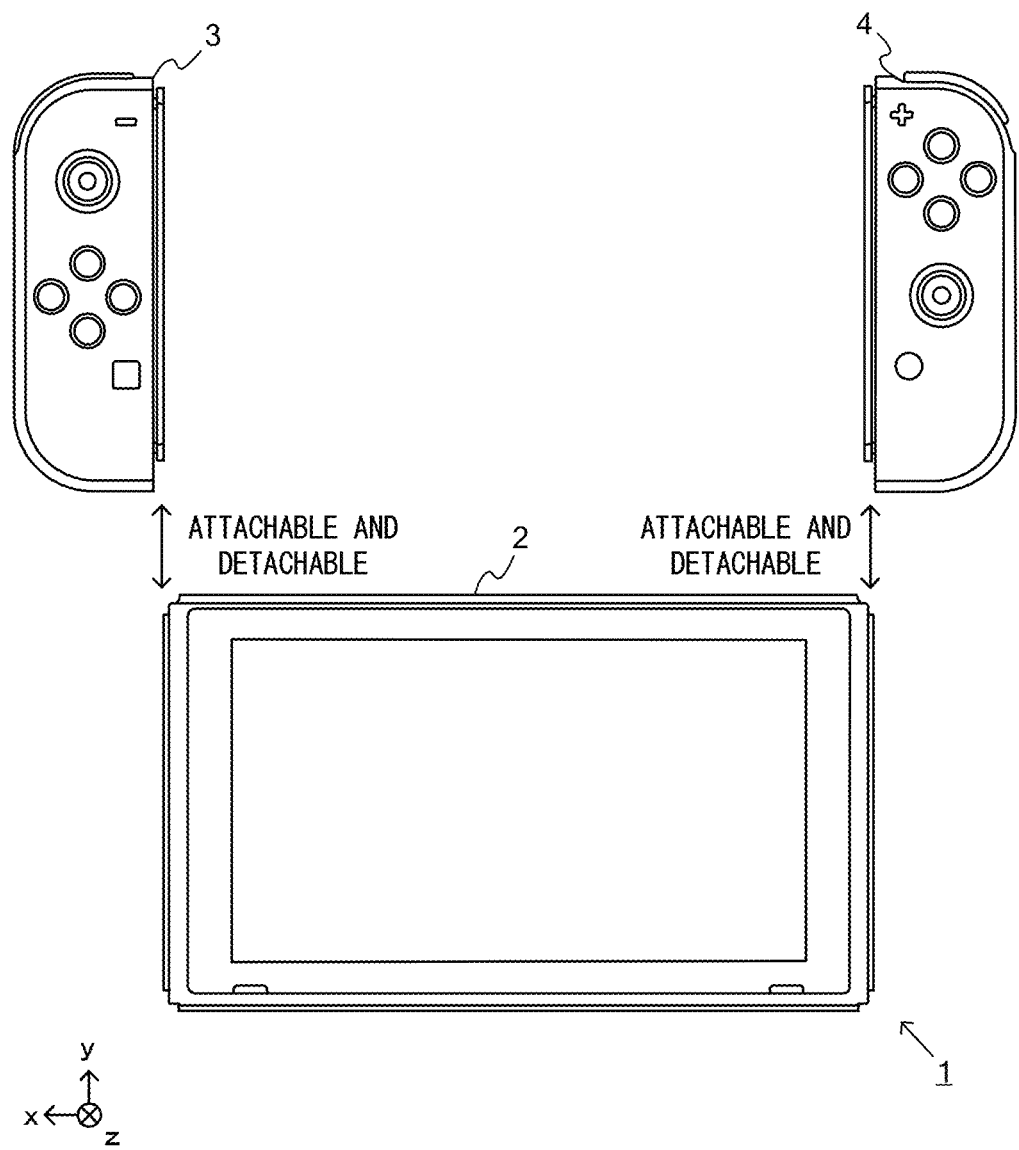
FIG. 2 is a diagram showing an example of the game system in which the left controller and the right controller are detached from the main body apparatus.

FIG. 2 is a diagram showing an example of the state where each of the left controller 3 and the right controller 4 is detached from the main body apparatus 2. As shown in FIGS. 1 and 2, the left controller 3 and the right controller 4 are attachable to and detachable from the main body apparatus 2. It should be noted that hereinafter, the left controller 3 and the right controller 4 will occasionally be referred to collectively as a "controller".

Figure 3:
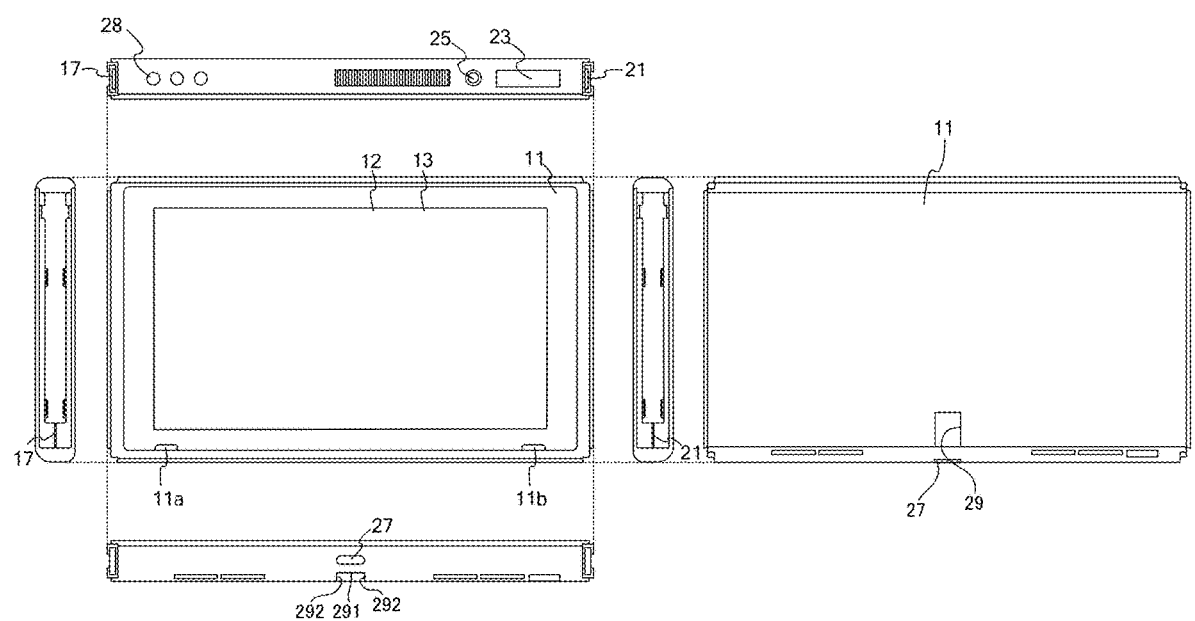
FIG. 3 is six orthogonal views showing an example of the main body apparatus shown in FIG. 1.

FIG. 3 is six orthogonal views showing an example of the main body apparatus 2. As shown in FIG. 3, the main body apparatus 2 includes an approximately plate-shaped housing 11. In the exemplary embodiment, a main surface (in other words, a surface on a front side, i.e., a surface on which the display 12 is provided) of the housing 11 has a generally rectangular shape.

It should be noted that the shape and the size of the housing 11 are optional. As an example, the housing 11 may be of a portable size. Further, the main body apparatus 2 alone or the unified apparatus obtained by attaching the left controller 3 and the right controller 4 to the main body apparatus 2 may function as a mobile apparatus. The main body apparatus 2 or the unified apparatus may function as a handheld apparatus or a portable apparatus.

As shown in FIG. 3, the main body apparatus 2 includes the display 12, which is provided on the main surface of the housing 11. The display 12 displays an image generated by the main body apparatus 2. In the exemplary embodiment, the display 12 is a liquid crystal display device (LCD). The display 12, however, may be a display device of any type.

Further, the main body apparatus 2 includes a touch panel 13 on a screen of the display 12. In the exemplary embodiment, the touch panel 13 is of a type that allows a multi-touch input (e.g., a capacitive type). The touch panel 13, however, may be of any type, and for example, the touch panel 13 may be of a type that allows a single-touch input (e.g., a resistive type).

The main body apparatus 2 includes speakers (i.e., speakers 88 shown in FIG. 6) within the housing 11. As shown in FIG. 3, speaker holes 11a and 11b are formed on the main surface of the housing 11. Then, sounds output from the speakers 88 are output through the speaker holes 11a and 11b.

Further, the main body apparatus 2 includes a left terminal 17, which is a terminal for the main body apparatus 2 to perform wired communication with the left controller 3, and a right terminal 21, which is a terminal for the main body apparatus 2 to perform wired communication with the right controller 4.

As shown in FIG. 3, the main body apparatus 2 includes a slot 23. The slot 23 is provided on an upper side surface of the housing 11. The slot 23 is so shaped as to allow a predetermined type of storage medium to be attached to the slot 23. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

A lower surface (predetermined surface) of the main body apparatus 2 includes a lower terminal 27. The lower terminal 27 is a terminal for the main body apparatus 2 to communicate with a cradle and the charging device, which will be described later, to perform charging. In the exemplary embodiment, the lower terminal 27 is a USB connector (more specifically, a female connector), and a male connector of a charging device 1000, which will be described later, is inserted into this female connector (connector insertion port) 27. Further, when the unified apparatus or the main body apparatus 2 alone is mounted on the cradle, the game system 1 can display on a stationary monitor an image generated by and output from the main body apparatus 2. Further, in the exemplary embodiment, the cradle has the function of charging the unified apparatus or the main body apparatus 2 alone mounted on the cradle. Further, the cradle has the function of a hub device (specifically, a USB hub).

Also, the center of the main body apparatus 2 in the left-right direction is provided with a groove (recessed portion) 29 that has a rectangular shape in a front view and extends upward from the portion at which the lower surface and the back surface are linked. This recessed portion 29 is formed to have a rectangular cross-section by a bottom surface 291 and side wall surfaces 292 on both the right and left sides of the bottom surface 291. Also, this groove 29 is formed at a position corresponding with the female connector 27 in the left-right direction, and is formed rearward of the female connector 27. Thus, the female connector 27 and the bottom surface 291 of the groove 29 are located apart from each other by a predetermined distance.

1-2. Left Controller

Figure 4:
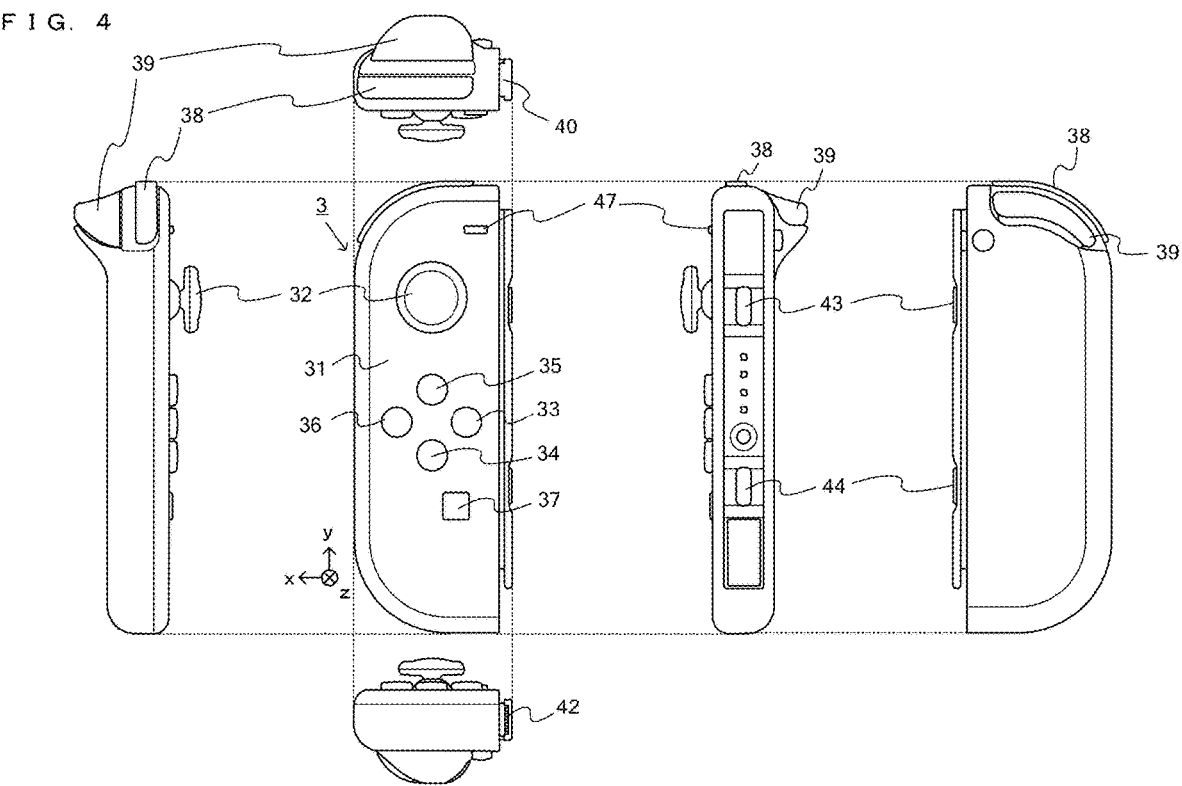
FIG. 4 is six orthogonal views showing an example of the left controller shown in FIG. 1.

FIG. 4 is six orthogonal views showing an example of the left controller 3. As shown in FIG. 4, the left controller 3 includes a housing 31. In the exemplary embodiment, the housing 31 has a vertically long shape, i.e., is shaped to be long in an up-down direction (i.e., a y-axis direction shown in FIGS. 1 and 4). In the state where the left controller 3 is detached from the main body apparatus 2, the left controller 3 can also be held in the orientation in which the left controller 3 is vertically long. The housing 31 has such a shape and a size that when held in the orientation in which the housing 31 is vertically long, the housing 31 can be held with one hand, particularly the left hand. Further, the left controller 3 can also be held in the orientation in which the left controller 3 is horizontally long. When held in the orientation in which the left controller 3 is horizontally long, the left controller 3 may be held with both hands.

The left controller 3 includes an analog stick 32. As shown in FIG. 4, the analog stick 32 is provided on a main surface of the housing 31. The analog stick 32 can be used as a direction input section with which a direction can be input. The user tilts the analog stick 32 and thereby can input a direction corresponding to the direction of the tilt (and input a magnitude corresponding to the angle of the tilt). It should be noted that the left controller 3 may include a directional pad, a slide stick that allows a slide input, or the like as the direction input section, instead of the analog stick. Further, in the exemplary embodiment, it is possible to provide an input by pressing the analog stick 32.

The left controller 3 includes various operation buttons. The left controller 3 includes four operation buttons 33 to 36 (specifically, a right direction button 33, a down direction button 34, an up direction button 35, and a left direction button 36) on the main surface of the housing 31. Further, the left controller 3 includes a record button 37 and a "−" (minus) button 47. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give instructions depending on various programs (e.g., an OS program and an application program) executed by the main body apparatus 2.

Further, the left controller 3 includes a terminal 42 for the left controller 3 to perform wired communication with the main body apparatus 2.

1-3. Right Controller

Figure 5:
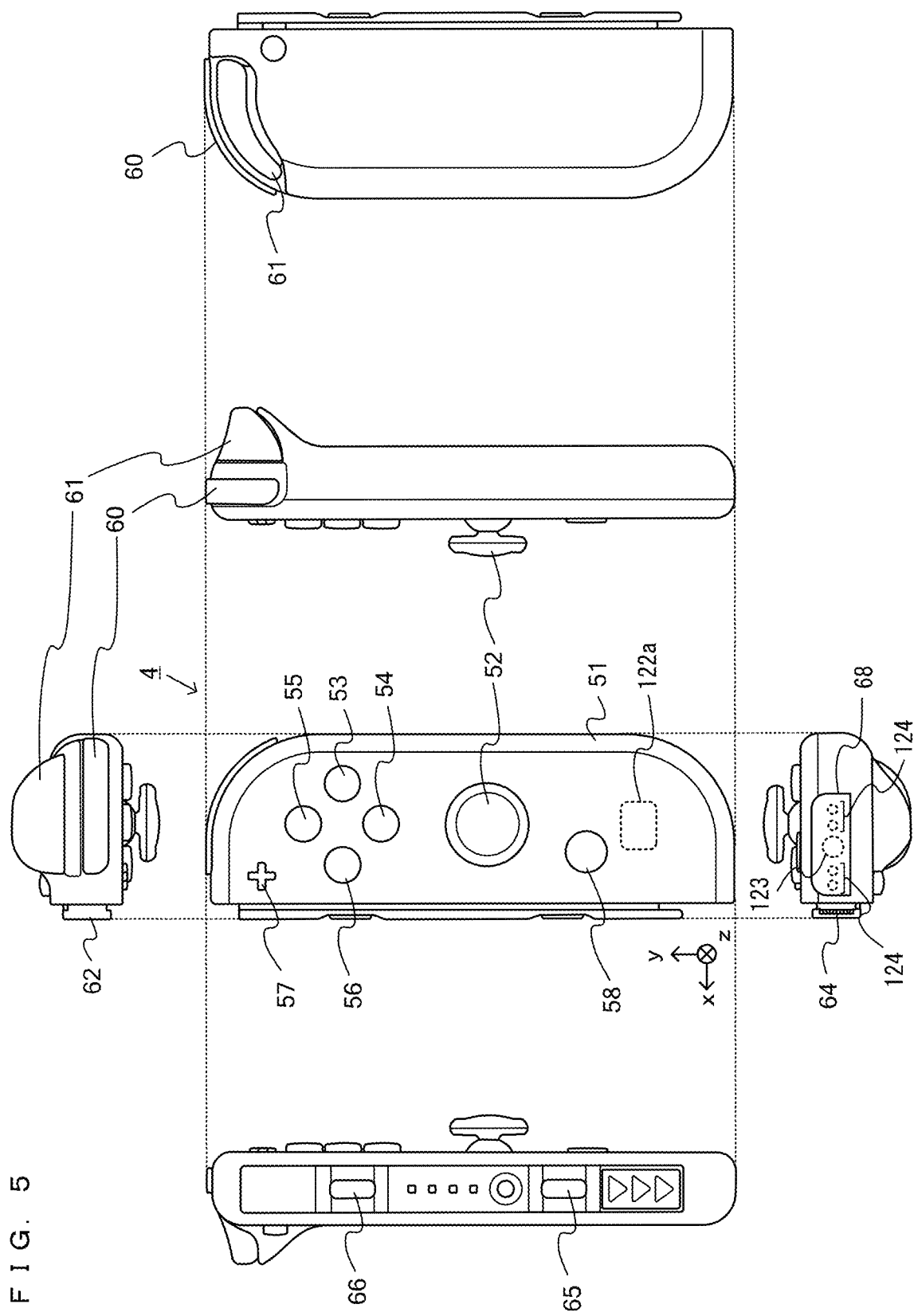
FIG. 5 is six orthogonal views showing an example of the right controller shown in FIG. 1.

FIG. 5 is six orthogonal views showing an example of the right controller 4. As shown in FIG. 5, the right controller 4 includes a housing 51. In the exemplary embodiment, the housing 51 has a vertically long shape, i.e., is shaped to be long in the up-down direction. In the state where the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly the right hand. Further, the right controller 4 can also be held in the orientation in which the right controller 4 is horizontally long. When held in the orientation in which the right controller 4 is horizontally long, the right controller 4 may be held with both hands. Here, for convenience of the description, the outer surface of the housing 51 of the right controller 4 is defined as follows. That is, the housing 51 is formed in an approximate rectangular parallelepiped shape, and includes a rectangular first main surface whose longitudinal direction is the up-down direction, and a second main surface that is opposite to the first main surface. Further, in the housing 51, the upper end surface in the longitudinal direction of these main surfaces constitutes a first end surface, and the lower end surface constitutes a second end surface. Also, a right side surface in the transverse direction of both main surfaces constitutes a first side end surface, and a left side surface constitutes a second side end surface. Note that a left end portion of the first end surface has a flat surface oriented upward in the longitudinal direction, and the first end surface is configured to be curved downward to the right side, and is linked to the upper end of the first side end surface. As described later, a curved first R-button 60 is disposed on this first end surface. Similarly, a left end portion of the second end surface has a flat surface oriented downward in the longitudinal direction, and the second end surface is configured to be curved upward to the right side, and is linked to the lower end of the first side end surface. An infrared image capturing section 123 and an infrared light-emitting section 124, which will be described later, are disposed on this second end surface.

Similarly to the left controller 3, the right controller 4 includes an analog stick 52 as a direction input section. In the exemplary embodiment, the analog stick 52 has the same configuration as that of the analog stick 32 of the left controller 3. Further, the right controller 4 may include a directional pad, a cross key, a slide stick that allows a slide input, or the like, instead of the analog stick. Further, similarly to the left controller 3, the right controller 4 includes four operation buttons 53 to 56 (specifically, an A-button 53, a B-button 54, an X-button 55, and a Y-button 56) on a main surface of the housing 51. Further, the right controller 4 includes a "+" (plus) button 57 and a home button 58. The operation buttons 53 to 58 and the analog stick 32 that are provided on the first main surface of the right controller 4 are examples of the first operation section of the present disclosure. Further, the right controller 4 includes a curved first R-button 60 on a first end surface of the housing 51 and a ZR-button 61 that protrudes toward the back surface and can be pushed from above on the back surface side of the first R-button 60. Further, a raised portion 500 is formed below this ZR button 61. This raised portion 500 is a site protruding from the second main surface, and has an inclined surface that extends toward the second main surface downward from the ZR-button 61. Here, the first R-button 60 is an example of the second operation section of the present disclosure, and the ZR-button 61 and the raised portion 500 are examples of the third operation section. Further, similarly to the left controller 3, the right controller 4 includes a second L-button 65 and a second R-button 66.

Further, a window portion 68 is provided on a second end surface of the housing 51. Although the details will be described later, the right controller 4 includes an infrared image capturing section 123 and an infrared light-emitting section 124, which are placed within the housing 51. The infrared image capturing section 123 captures a portion around the right controller 4 through the window portion 68 such that a down direction of the right controller 4 (a negative y-axis direction shown in FIG. 5) is the image capturing direction. The infrared light-emitting section 124 emits infrared light through the window portion 68 to an image capturing target to be captured by the infrared image capturing section 123 such that a predetermined range about the down direction of the right controller 4 (the negative y-axis direction shown in FIG. 5) is the emission range. The window portion 68 is used to protect a lens of a camera of the infrared image capturing section 123, a light emitter of the infrared light-emitting section 124, and the like and composed of a material (e.g., a transparent material) that transmits light of a wavelength sensed by the camera and light emitted from the light emitter. It should be noted that the window portion 68 may be a hole formed in the housing 51. It should be noted that in the exemplary embodiment, the infrared image capturing section 123 itself includes a filter member for inhibiting the transmission of light of a wavelength other than light sensed by the camera (infrared light in the exemplary embodiment). In another exemplary embodiment, the window portion 68 may have the function of a filter.

Further, although the details will be described later, the right controller 4 includes an NFC communication section 122. The NFC communication section 122 performs short-range wireless communication based on the NFC (Near Field Communication) standard. The NFC communication section 122 includes an antenna 122a, which is used for short-range wireless communication, and a circuit (e.g., an NFC chip) for generating a signal (a radio wave) to be sent from the antenna 122a. It should be noted that the NFC communication section 122 may perform short-range wireless communication through any proximity communication (or contactless communication), instead of performing short-range wireless communication based on the NFC standard. Here, the NFC standard can be used for proximity communication (contactless communication), and "may perform short-range wireless communication through any proximity communication (or contactless communication)" is intended to mean that short-range wireless communication may be performed through other proximity communication except for proximity communication based on the NFC standard.

Further, the right controller 4 includes a terminal 64 for the right controller 4 to perform wired communication with the main body apparatus 2.

1-4. Internal Configuration of Main Body Apparatus

Figure 6:
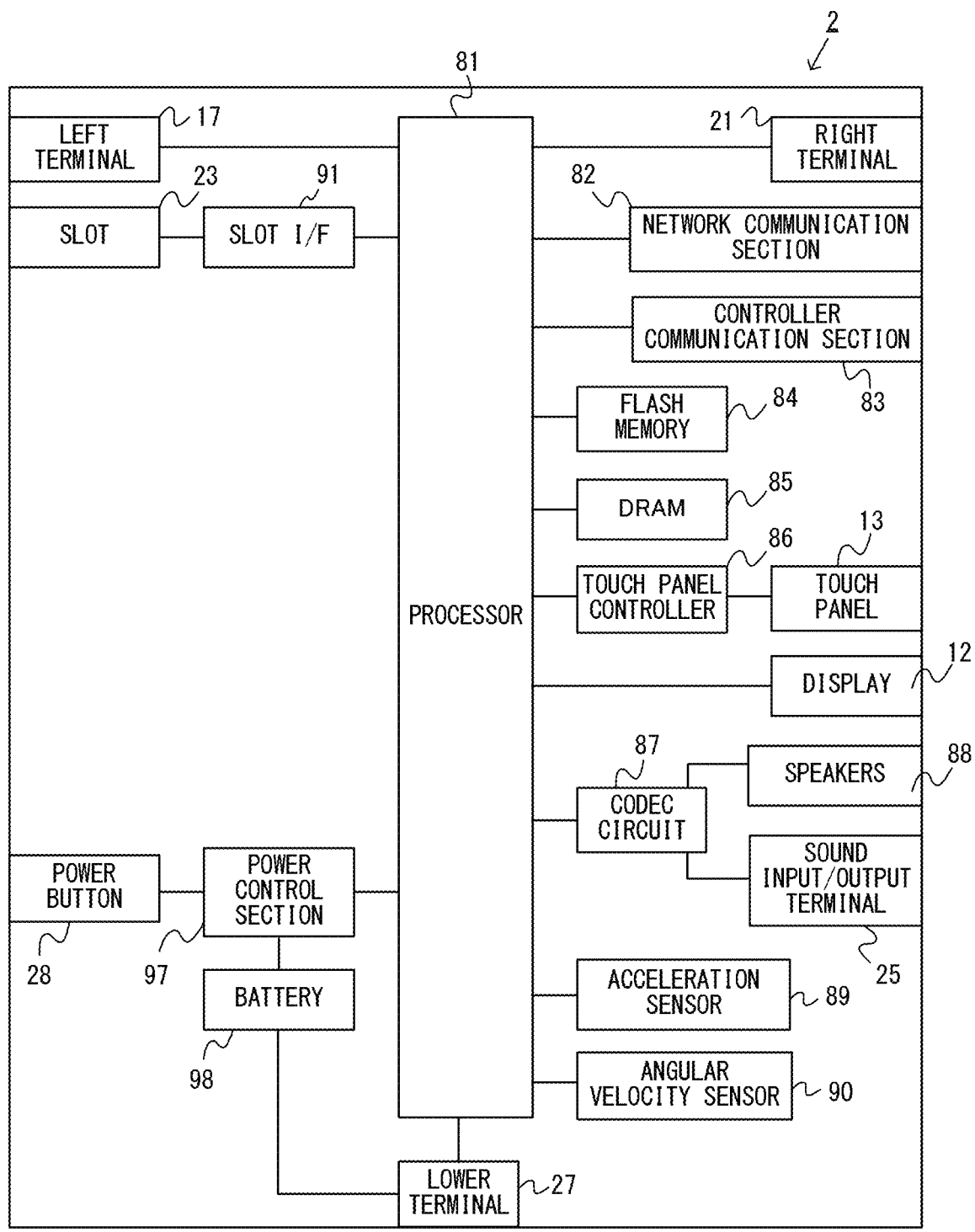
FIG. 6 is a block diagram showing an example of the internal configuration of the main body apparatus shown in FIG. 1.

FIG. 6 is a block diagram showing an example of the internal configuration of the main body apparatus 2. The main body apparatus 2 includes components 81 to 91, 97, and 98 shown in FIG. 6 in addition to the components shown in FIG. 3. Some of the components 81 to 91, 97, and 98 may be mounted as electronic components on an electronic circuit board and accommodated in the housing 11.

The main body apparatus 2 includes a processor 81. The processor 81 is an information processing section for executing various types of information processing to be executed by the main body apparatus 2. For example, the processor 81 may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 includes a flash memory 84 and a DRAM (Dynamic Random. Access Memory) 85 as examples of internal storage media built into the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing.

The main body apparatus 2 includes a slot interface (hereinafter abbreviated as "I/F") 91. The slot I/F 91 is connected to the processor 81. The slot I/F 91 is connected to the slot 23, and in accordance with an instruction from the processor 81, reads and writes data from and to the predetermined type of storage medium (e.g., a dedicated memory card) attached to the slot 23.

The processor 81 appropriately reads and writes data from and to the flash memory 84, the DRAM 85, and each of the above storage media, thereby performing the above information processing.

The main body apparatus 2 includes a network communication section 82. The network communication section 82 is connected to the processor 81. The network communication section 82 communicates (specifically, through wireless communication) with an external apparatus via a network. In the exemplary embodiment, as a first communication form, the network communication section 82 connects to a wireless LAN and communicates with an external apparatus, using a method compliant with the Wi-Fi standard. Further, as a second communication form, the network communication section 82 wirelessly communicates with another main body apparatus 2 of the same type, using a predetermined communication method (e.g., communication based on a unique protocol or infrared light communication). It should be noted that the wireless communication in the above second communication form achieves the function of enabling so-called "local communication" in which the main body apparatus 2 can wirelessly communicate with another main body apparatus 2 placed in a closed local network area, and the plurality of main body apparatuses 2 directly communicate with each other to transmit and receive data.

The main body apparatus 2 includes a controller communication section 83. The controller communication section 83 is connected to the processor 81. The controller communication section 83 wirelessly communicates with the left controller 3 and/or the right controller 4. The communication method between the main body apparatus 2 and the left controller 3 and the right controller 4 is optional. In the exemplary embodiment, the controller communication section 83 performs communication compliant with the Bluetooth (registered trademark) standard with the left controller 3 and with the right controller 4.

The processor 81 is connected to the left terminal 17, the right terminal 21, and the lower terminal 27. When performing wired communication with the left controller 3, the processor 81 transmits data to the left controller 3 via the left terminal 17 and also receives operation data from the left controller 3 via the left terminal 17. Further, when performing wired communication with the right controller 4, the processor 81 transmits data to the right controller 4 via the right terminal 21 and also receives operation data from the right controller 4 via the right terminal 21. Further, when communicating with the cradle, the processor 81 transmits data to the cradle via the lower terminal 27. As described above, in the exemplary embodiment, the main body apparatus 2 can perform both wired communication and wireless communication with each of the left controller 3 and the right controller 4. Further, when the unified apparatus obtained by attaching the left controller 3 and the right controller 4 to the main body apparatus 2 or the main body apparatus 2 alone is attached to the cradle, the main body apparatus 2 can output data (e.g., image data or sound data) to the stationary monitor or the like via the cradle.

Here, the main body apparatus 2 can communicate with a plurality of left controllers 3 simultaneously (in other words, in parallel). Further, the main body apparatus 2 can communicate with a plurality of right controllers 4 simultaneously (in other words, in parallel). Thus, a plurality of users can simultaneously provide inputs to the main body apparatus 2, each using a set of the left controller 3 and the right controller 4. As an example, a first user can provide an input to the main body apparatus 2 using a first set of the left controller 3 and the right controller 4, and simultaneously, a second user can provide an input to the main body apparatus 2 using a second set of the left controller 3 and the right controller 4.

The main body apparatus 2 includes a touch panel controller 86, which is a circuit for controlling the touch panel 13. The touch panel controller 86 is connected between the touch panel 13 and the processor 81. Based on a signal from the touch panel 13, the touch panel controller 86 generates, for example, data indicating the position where a touch input is provided. Then, the touch panel controller 86 outputs the data to the processor 81.

Further, the display 12 is connected to the processor 81. The processor 81 displays a generated image (e.g., an image generated by executing the above information processing) and/or an externally acquired image on the display 12.

The main body apparatus 2 includes a codec circuit 87 and speakers (specifically, a left speaker and a right speaker) 88. The codec circuit 87 is connected to the speakers 88 and a sound input/output terminal 25 and also connected to the processor 81. The codec circuit 87 is a circuit for controlling the input and output of sound data to and from the speakers 88 and the sound input/output terminal 25.

Further, the main body apparatus 2 includes an acceleration sensor 89. In the exemplary embodiment, the acceleration sensor 89 detects the magnitudes of accelerations along predetermined three axial (e.g., xyz axes shown in FIG. 1) directions. It should be noted that the acceleration sensor 89 may detect an acceleration along one axial direction or accelerations along two axial directions.

Further, the main body apparatus 2 includes an angular velocity sensor 90. In the exemplary embodiment, the angular velocity sensor 90 detects angular velocities about predetermined three axes (e.g., the xyz axes shown in FIG. 1). It should be noted that the angular velocity sensor 90 may detect an angular velocity about one axis or angular velocities about two axes.

The acceleration sensor 89 and the angular velocity sensor 90 are connected to the processor 81, and the detection results of the acceleration sensor 89 and the angular velocity sensor 90 are output to the processor 81. Based on the detection results of the acceleration sensor 89 and the angular velocity sensor 90, the processor 81 can calculate information regarding the motion and/or the orientation of the main body apparatus 2.

The main body apparatus 2 includes a power control section 97 and a battery 98. The power control section 97 is connected to the battery 98 and the processor 81. Further, although not shown in FIG. 6, the power control section 97 is connected to components of the main body apparatus 2 (specifically, components that receive power supplied from the battery 98, the left terminal 17, and the right terminal 21). Based on a command from the processor 81, the power control section 97 controls the supply of power from the battery 98 to the above components.

Further, the battery 98 is connected to the lower terminal 27. When an external charging device (e.g., the cradle) is connected to the lower terminal 27, and power is supplied to the main body apparatus 2 via the lower terminal 27, the battery 98 is charged with the supplied power.

1-5. Internal Configuration of Controller

FIG. 7 is a block diagram showing examples of the internal configurations of the main body apparatus 2, the left controller 3, and the right controller 4. It should be noted that the details of the internal configuration of the main body apparatus 2 are shown in FIG. 6 and therefore are omitted in FIG. 7.

The left controller 3 includes a communication control section 101, which communicates with the main body apparatus 2. As shown in FIG. 7, the communication control section 101 is connected to components including the terminal 42. In the exemplary embodiment, the communication control section 101 can communicate with the main body apparatus 2 through both wired communication via the terminal 42 and wireless communication not via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44, and 47). Further, the left controller 3 includes the analog stick ("stick" in FIG. 7) 32. Each of the buttons 103 and the analog stick 32 outputs information regarding an operation performed on itself to the communication control section 101 repeatedly at appropriate timing.

The left controller 3 includes inertial sensors. Specifically, the left controller 3 includes an acceleration sensor 104. Further, the left controller 3 includes an angular velocity sensor 105. In the exemplary embodiment, the acceleration sensor 104 detects the magnitudes of accelerations along predetermined three axial (e.g., xyz axes shown in FIG. 4) directions. It should be noted that the acceleration sensor 104 may detect an acceleration along one axial direction or accelerations along two axial directions. In the exemplary embodiment, the angular velocity sensor 105 detects angular velocities about predetermined three axes (e.g., the xyz axes shown in FIG. 4). It should be noted that the angular velocity sensor 105 may detect an angular velocity about one axis or angular velocities about two axes. Each of the acceleration sensor 104 and the angular velocity sensor 105 is connected to the communication control section 101. Then, the detection results of the acceleration sensor 104 and the angular velocity sensor 105 are output to the communication control section 101 repeatedly at appropriate timing.

The communication control section 101 acquires information regarding an input (specifically, information regarding an operation or the detection result of the sensor) from each of input sections (specifically, the buttons 103, the analog stick 32, and the sensors 104 and 105). The communication control section 101 transmits operation data including the acquired information (or information obtained by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the analog stick 32 based on the operation data. Further, the main body apparatus 2 can calculate information regarding the motion and/or the orientation of the left controller 3 based on the operation data (specifically, the detection results of the acceleration sensor 104 and the angular velocity sensor 105).

The left controller 3 includes a vibrator 107 for giving notification to the user by a vibration. In the exemplary embodiment, the vibrator 107 is controlled by a command from the main body apparatus 2. That is, if receiving the above command from the main body apparatus 2, the communication control section 101 drives the vibrator 107 in accordance with the received command. Here, the left controller 3 includes a codec section 106. If receiving the above command, the communication control section 101 outputs a control signal corresponding to the command to the codec section 106. The codec section 106 generates a driving signal for driving the vibrator 107 from the control signal from the communication control section 101 and outputs the driving signal to the vibrator 107. Consequently, the vibrator 107 operates.

More specifically, the vibrator 107 is a linear vibration motor. Unlike a regular motor that rotationally moves, the linear vibration motor is driven in a predetermined direction in accordance with an input voltage and therefore can be vibrated at an amplitude and a frequency corresponding to the waveform of the input voltage. In the exemplary embodiment, a vibration control signal transmitted from the main body apparatus 2 to the left controller 3 may be a digital signal representing the frequency and the amplitude every unit of time. In another exemplary embodiment, the main body apparatus 2 may transmit information indicating the waveform itself. The transmission of only the amplitude and the frequency, however, enables a reduction in the amount of communication data. Additionally, to further reduce the amount of data, only the differences between the numerical values of the amplitude and the frequency at that time and the previous values may be transmitted, instead of the numerical values. In this case, the codec section 106 converts a digital signal indicating the values of the amplitude and the frequency acquired from the communication control section 101 into the waveform of an analog voltage and inputs a voltage in accordance with the resulting waveform, thereby driving the vibrator 107. Thus, the main body apparatus 2 changes the amplitude and the frequency to be transmitted every unit of time and thereby can control the amplitude and the frequency at which the vibrator 107 is to be vibrated at that time. It should be noted that not only a single amplitude and a single frequency, but also two or more amplitudes and two or more frequencies may be transmitted from the main body apparatus 2 to the left controller 3. In this case, the codec section 106 combines waveforms indicated by the plurality of received amplitudes and frequencies and thereby can generate the waveform of a voltage for controlling the vibrator 107.

The left controller 3 includes a power supply section 108. In the exemplary embodiment, the power supply section 108 includes a battery and a power control circuit. Although not shown in FIG. 7, the power control circuit is connected to the battery and also connected to components of the left controller 3 (specifically, components that receive power supplied from the battery).

As shown in FIG. 7, the right controller 4 includes a communication control section 111, which communicates with the main body apparatus 2. Further, the right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the left controller 3. Thus, the communication control section 111 can communicate with the main body apparatus 2 through both wired communication via the terminal 64 and wireless communication not via the terminal 64 (specifically, communication compliant with the Bluetooth (registered trademark) standard). The communication control section 111 controls the method for communication performed by the right controller 4 with the main body apparatus 2.

The right controller 4 includes input sections similar to the input sections of the left controller 3. Specifically, the right controller 4 includes buttons 113, the analog stick 52, and inertial sensors (an acceleration sensor 114 and an angular velocity sensor 115). These input sections have functions similar to those of the input sections of the left controller 3 and operate similarly to the input sections of the left controller 3.

Further, the right controller 4 includes a vibrator 117 and a codec section 116. The vibrator 117 and the codec section 116 operate similarly to the vibrator 107 and the codec section 106, respectively, of the left controller 3. That is, in accordance with a command from the main body apparatus 2, the communication control section 111 causes the vibrator 117 to operate, using the codec section 116.

The right controller 4 includes the NFC communication section 122, which performs short-range wireless communication based on the NFC standard. The NFC communication section 122 has the function of a so-called NFC reader/writer. Here, the term "short-range wireless communication" as used herein includes a communication method where a radio wave from an apparatus (here, the right controller 4) develops an electromotive force (e.g., by electromagnetic induction) in another device (here, a device near the antenna 122a). The other device can operate by the developed electromotive force, and may or may not have a power supply. When the right controller 4 (the antenna 122a) and a communication target come close to each other (typically, the distance between the right controller 4 and the communication target becomes dozen centimeters or less), the NFC communication section 122 becomes able to communicate with the communication target. The communication target is any apparatus capable of performing short-range wireless communication with the NFC communication section 122 and is, for example, an NFC tag or a storage medium having the function of an NFC tag. Alternatively, the communication target may be another apparatus having an NFC card emulation function.

Further, the right controller 4 includes the infrared image capturing section 123 on the second end surface. The infrared image capturing section 123 includes an infrared camera for capturing a portion around the right controller 4. As an example, the main body apparatus 2 and/or the right controller 4 calculate information of a captured image (e.g., information related to the luminance of a plurality of blocks into which at least the entirety of a partial area of a captured image is divided or the like), and based on the calculated information, determine a change in the portion around the right controller 4. Further, the infrared image capturing section 123 may capture an image using ambient light, but in the exemplary embodiment, includes the infrared light-emitting section 124, which emits infrared light. The infrared light-emitting section 124 emits infrared light, for example, in synchronization with the timing when the infrared camera captures an image. Then, the infrared light emitted from the infrared light-emitting section 124 is reflected by an image capturing target, and the infrared camera receives the reflected infrared light, thereby acquiring an image of the infrared light. This enables the infrared image capturing section 123 to obtain a clearer infrared light image. It should be noted that the infrared image capturing section 123 and the infrared light-emitting section 124 may be provided as different devices in the right controller 4, or may be provided as a single device in the same package in the right controller 4. Further, in the exemplary embodiment, the infrared image capturing section 123 including an infrared camera is used. In another exemplary embodiment, a visible light camera (a camera using a visible light image sensor) may be used as image capturing means, instead of the infrared camera.

The right controller 4 includes a processing section 121. The processing section 121 is connected to the communication control section 111. Further, the processing section 121 is connected to the NFC communication section 122, the infrared image capturing section 123, and the infrared light-emitting section 124. In accordance with a command from the main body apparatus 2, the processing section 121 performs the process of managing the NFC communication section 122. For example, in accordance with a command from the main body apparatus 2, the processing section 121 controls the operation of the NFC communication section 122. Further, the processing section 121 controls the start of the NFC communication section 122 or controls the operations (specifically, reading, writing, and the like) of the NFC communication section 122 performed on a communication target (e.g., an NFC tag). Further, the processing section 121 receives, from the main body apparatus 2, information to be transmitted to the communication target via the communication control section 111 and passes the information to the NFC communication section 122. Further, the processing section 121 acquires, from the NFC communication section 122, information received from the communication target and transmits the information to the main body apparatus 2 via the communication control section 111.

Further, the processing section 121 includes a CPU, a memory, and the like. Based on a predetermined program (e.g., an application program for performing image processing and various calculations) stored in a storage device (e.g., a non-volatile memory or the like) (not shown) included in the right controller 4, and in accordance with a command from the main body apparatus 2, the processing section 121 performs the process of managing the infrared image capturing section 123. For example, the processing section 121 causes the infrared image capturing section 123 to perform an image capturing operation. Further, the processing section 121 acquires and/or calculates information based on an image capturing result (information of a captured image, information calculated from this information, or the like) and transmits the information to the main body apparatus 2 via the communication control section 111. Further, in accordance with a command from the main body apparatus 2, the processing section 121 performs the process of managing the infrared light-emitting section 124. For example, in accordance with a command from the main body apparatus 2, the processing section 121 controls the light emission of the infrared light-emitting section 124. It should be noted that a memory used by the processing section 121 to perform processing may be provided in the processing section 121 or may be the memory 112.

The right controller 4 includes a power supply section 118. The power supply section 118 has a function similar to that of the power supply section 108 of the left controller 3 and operates similarly to the power supply section 108.

2. Charging Device

Figure 12:
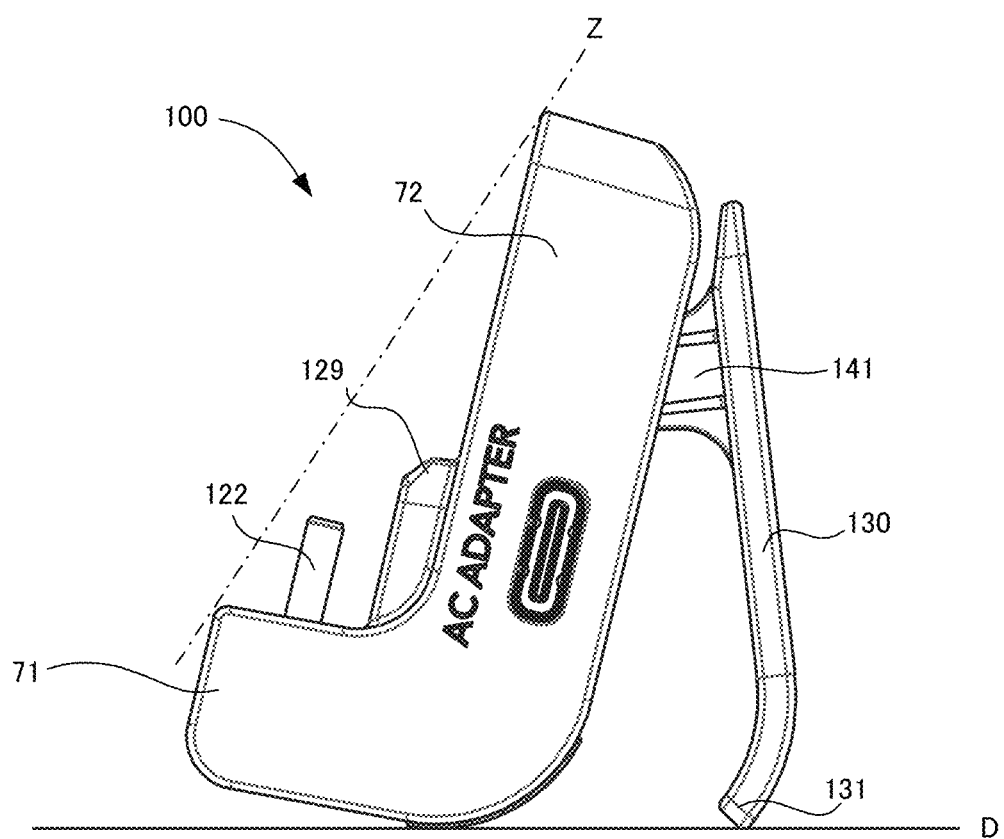
FIG. 12 is a side view of the charging device installed on an installation surface in a tilted state.

Next, an electric conduction apparatus according to the exemplary embodiment will be described with reference to the drawings. It should be noted that the following description is based on the directions shown in FIG. 8, and with regard to the other diagrams as well, the description will be given based on the directions shown in FIG. 8. Note that, as shown in FIG. 12 that will be described later, although the charging device is disposed tilted, regardless of this orientation, the side on which the front surface of the extension portion of the housing is located is referred to as "front", the side on which the back surface of the extension portion that is opposite thereto is located is referred to as "back", and these directions are the directions used to describe the charging device according to the exemplary embodiment in this specification.

2-1. Summary of Charging Device

Figure 8:
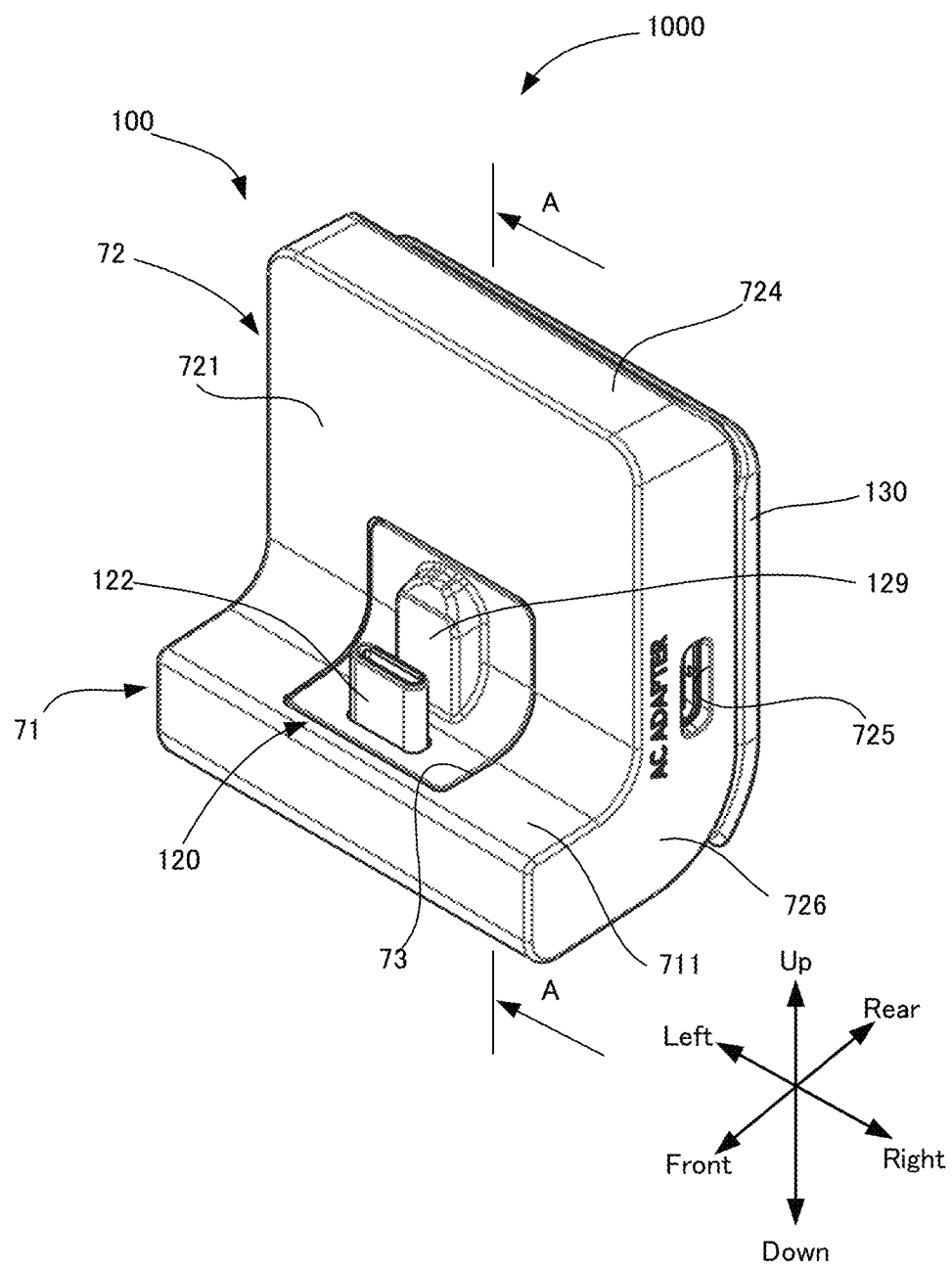
FIG. 8 is a perspective view of a charging device according to an exemplary embodiment of the present disclosure.

FIG. 8 is a perspective view of the charging device. As shown in FIG. 8, this charging device 1000 mainly includes a housing 100 formed in an L-shape in a side view, a connector support member 120 attached to the front surface side of the housing 110, and a plate-shaped stand member 130 attached to the back surface of this housing 110. Hereinafter, these members and accessory members built in these members will be described in detail.

2-1-1. Housing

Figure 9:
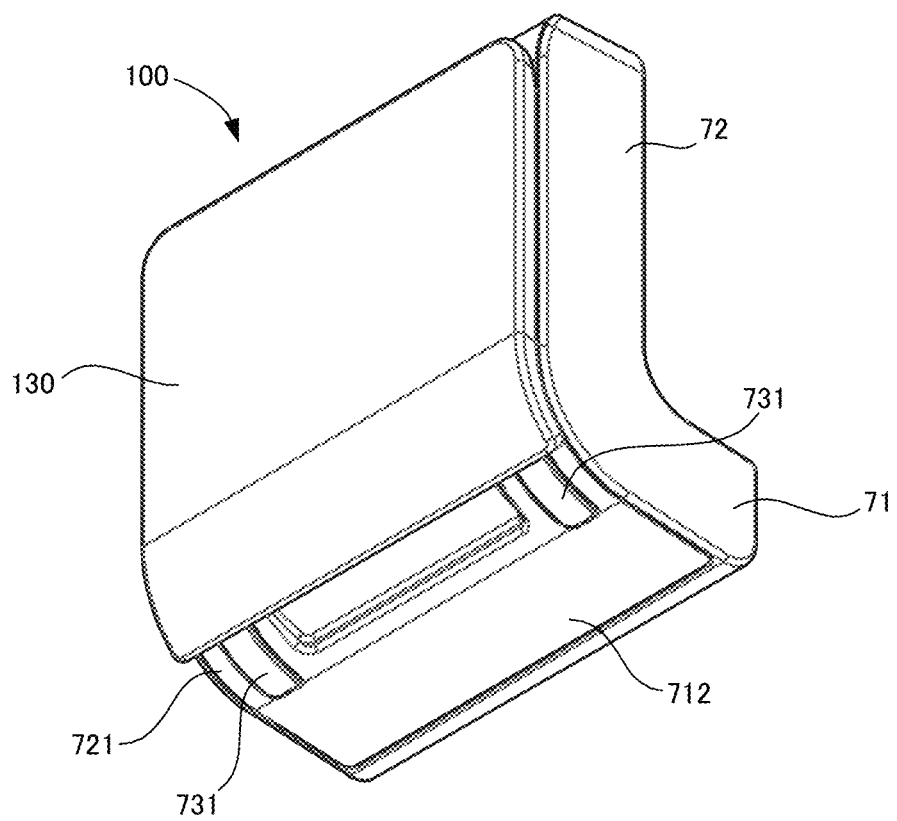
FIG. 9 is a perspective view of the charging device shown in FIG. 8 viewed from the back surface side.
Figure 10:
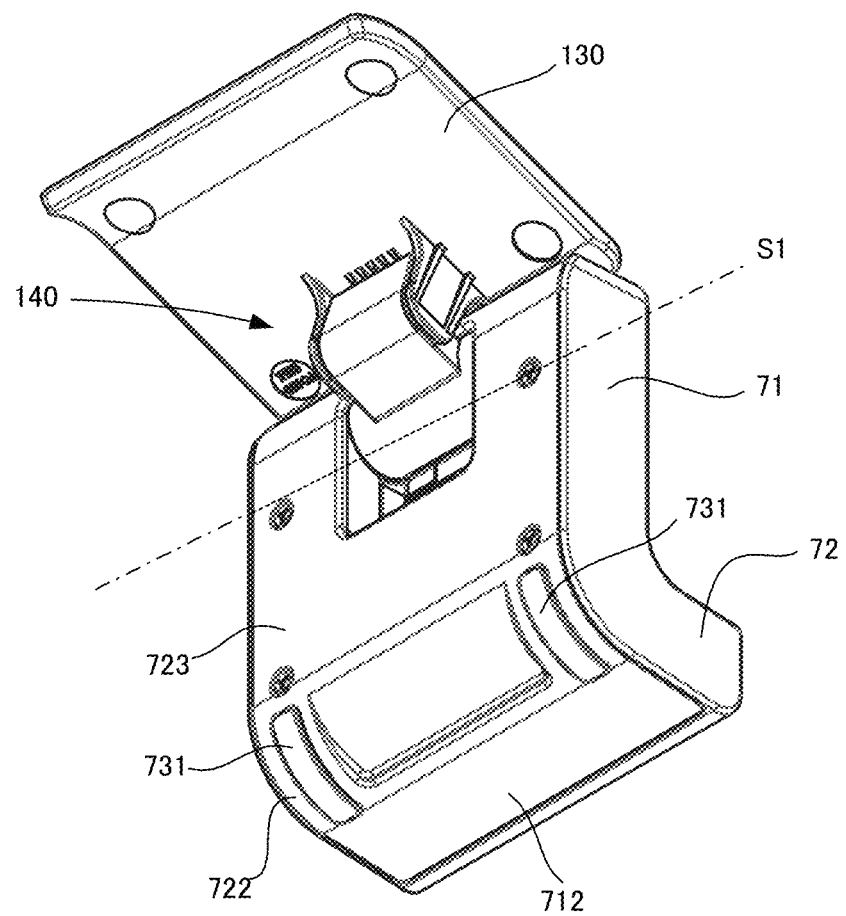
FIG. 10 is a perspective view showing a state where a stand member is pivoted in FIG. 9.
Figure 11:
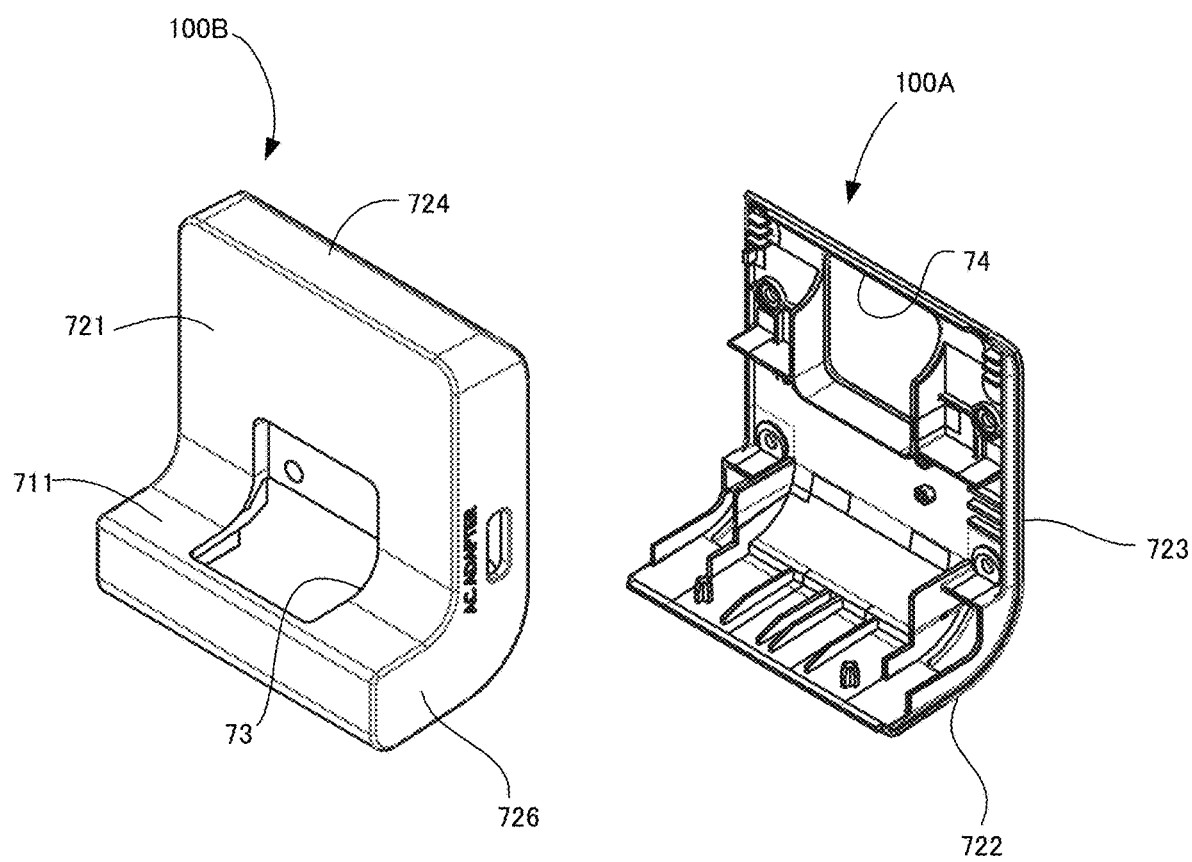
FIG. 11 is an exploded perspective view of a housing.

Next, the housing 100 will be described also with reference to FIG. 9. FIG. 9 is a perspective view of the charging device viewed from the back surface side, FIG. 10 is a perspective view showing a state where the stand member is pivoted in FIG. 9, and FIG. 11 is an exploded perspective view of the housing. As shown in FIGS. 8 to 10, this housing 100 includes a rectangular parallelepiped base portion 71 extending in the front-back direction, and a rectangular parallelepiped extension portion 72 extending upward from the rear end portion of this base portion 71, and the L-shape in aside view is formed by combining the base portion 71 and the extension portion 72. An upper surface (also referred to as "support surface") 711 of the base portion 71 has a rectangular shape, and can support the game system 1. Further, a front surface 721 of the extension portion 72 is continuous with the upper surface 711 of the base portion 71 and extends upward, and a portion at which the upper surface 711 of the base portion 71 and the front surface 721 of the extension portion 72 are linked together is curved in an arc shape in a side view. Also, a front opening 73 that is in communication with the internal space of the housing 100 is formed extending from the vicinity of the center of the upper surface 711 of the base portion 71 to the vicinity of the center of the front surface 721 of the extension portion 72. This front opening 73 is formed such that a rectangular through-hole formed in the upper surface 711 of the base portion 71 links with a rectangular through-hole formed in the front surface 721 of the extension portion 72. Further, the above-described connector support member 120 is fitted into this front opening 73.

The lower surface 722 of the extension portion 72 of the housing is formed by a curved surface that links the lower surface 712 of the base portion 71 and the back surface 723 of the extension portion 72 and is formed in an arc shape in a side view. Band-shaped anti-slip members 731 are attached to both sides of this lower surface 722, and these members play the role of slip prevention. It should be noted that the anti-slip members 731 can be made of rubber, silicone, or the like.

Also, as shown in FIG. 11, the housing 100 is constituted by a rear panel 100A, which is constituted by the back surface 723 of the extension portion 72, the lower surface 722 of the extension portion 72, and the lower surface of the base portion 71, being combined with a front panel 100B constituted by the outer surfaces other than this rear panel 100A.

2-1-2. Stand Member and Linking Mechanism for Linking Housing and Stand Member

Next, the stand member 130 and the linking mechanism for linking the housing 100 and the stand member 130 will be described also with reference to FIG. 12. FIG. 12 is a side view of the charging device installed on an installation surface in a tilted state.

As shown in FIGS. 9 and 10, the stand member 130 is formed in a rectangular plate-shape, and is attached to the back surface of the housing 100, that is, the back surface 723 of the extension portion 72. More specifically, the vicinity of an upper end portion of the stand member 130 is attached to the vicinity of an upper end portion of the back surface 723 of the housing 100 so as to be pivotable along an axis line S1 (second axis line) that extends in the left-right direction. Accordingly, as shown in FIG. 12, the angle of the stand member 130 with respect to the housing 100 can be changed in a state where the lower surface 722 of the housing 100 and the lower end portion 131 of the stand member 130 are in contact with an installation surface D. That is, it is possible to change the angle at which the housing 100 is installed.

This stand member 130 has substantially the same size as the back surface 723 of the extension portion 72, and its lower end portion 131 is slightly curved forward. The lower end portion of the stand member 130 is formed so as to extend along the lower surface 722 of the extension portion 72 when, for example, as shown in FIG. 8, the stand member 130 is brought into contact with the back surface 723 of the housing 100 by changing the angle of the stand member 130 with respect to the housing 100.

On the other hand, the vicinity of an upper portion of the front surface of the stand member 130 is provided with a fixing tool 140 that is a portion of the linking mechanism.

Figure 13:
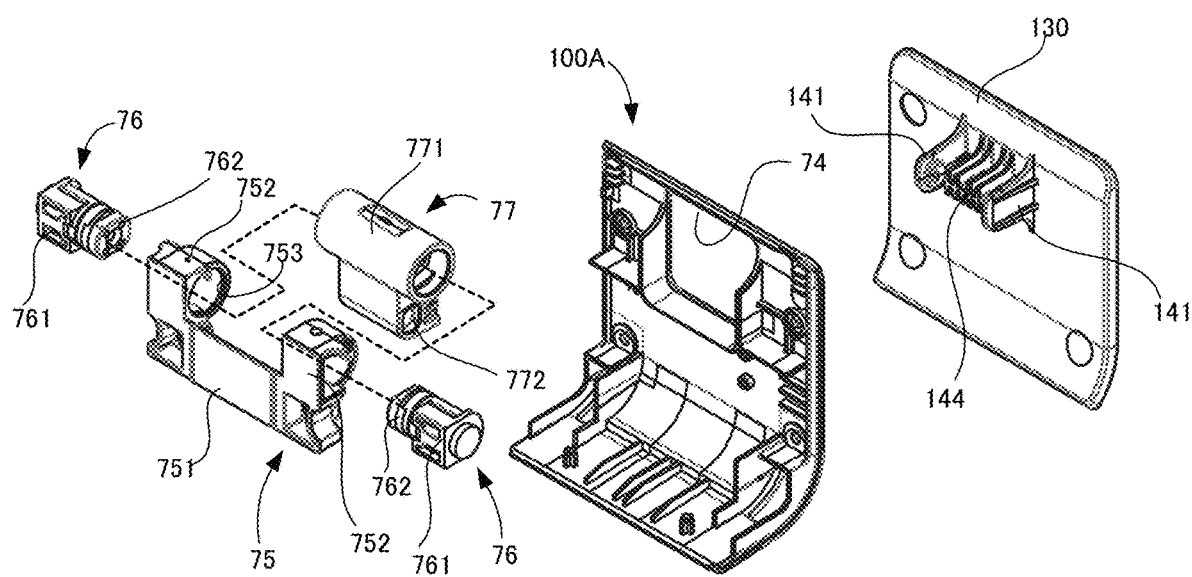
FIG. 13 is an exploded perspective view of the housing, a linking mechanism, and a stand member.
Figure 14:
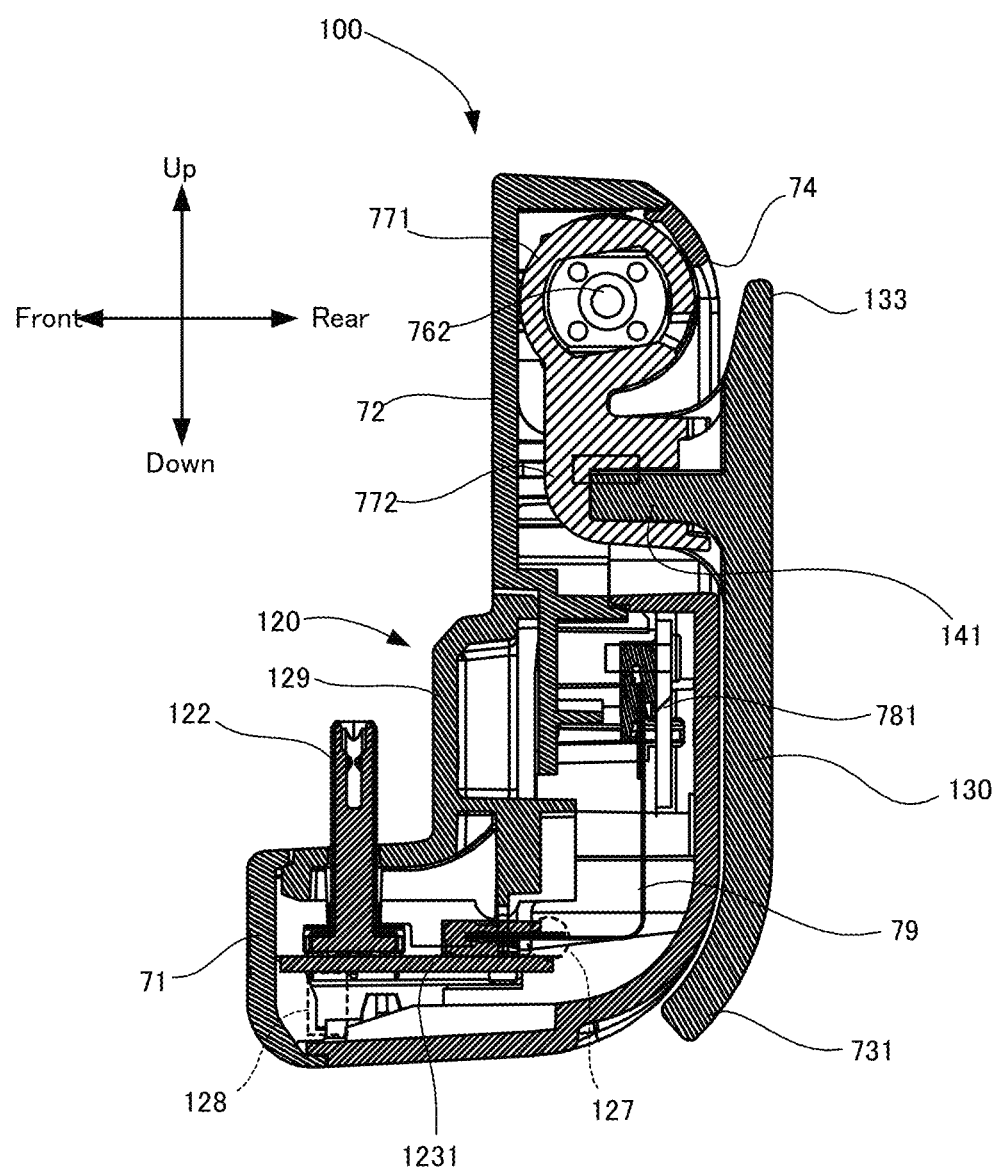
FIG. 14 is a cross-sectional view taken along line A-A in FIG. 8.

Next, the linking mechanism will be described in detail. FIG. 13 is an exploded perspective view of the housing, the linking mechanism, and the stand member, and FIG. 14 is a cross-sectional view taken along line A-A in FIG. 8. As shown in FIG. 13, a rectangular rear opening 74 is formed in the vicinity of the upper end of the back surface 723 of the extension portion 72, and the rear opening 74 is in communication with the internal space of the housing 100. Also, the internal space of the housing 100 accommodates a support member (first site) 75 that constitutes the linking mechanism, a pair of torque hinges (hinge portions) 76 attached to this support member 75, and a pivoting member (second site) 77 attached to the support member 75 via these torque hinges 76.

As shown in FIG. 13, the support member 75 includes a plate-shaped linking plate 751 and a pair of support portions 752 attached to left and right sides of this linking plate 751. The linking plate 751 is disposed so as to cover a portion of the rear opening 74 of the back surface 723 of the housing 100 from the internal space side. The support portions 752 each have a cylindrical mounting space 753, and the torque hinges 76 are fitted into these mounting spaces 753. The two torque hinges 76 are then disposed protruding from the support portions 752 so as to face each other.

A known torque hinge can be used as the torque hinge 76, and the torque hinge 76 includes a cylindrical external tube 761 and a cylindrical shaft portion 762 that is fitted into this external tube 761, and the shaft portion 762 is rotatably attached to the external tube 761. At this time, the shaft portion 762 cannot rotate with respect to the external tube 761 unless a predetermined torque is applied, and as will be described later, the stand member 130 can steplessly adjust the angle of pivoting with respect to the housing 100. (Also, this angle can be kept as long as the applied force is approximately the predetermined torque or less.) The external tube 761 is fitted into the support portion 752 of the support member 75, and the shaft portion 762 protrudes from the external tube 761 and is fitted into the pivoting member 77.

The pivoting member 77 is disposed between the two support portions 752 of the support member 75. More specifically, the pivoting member 77 includes a cylindrical pivoting portion 771 and a second fixing tool (linking portion) 772 attached to an outer circumferential surface of this pivoting portion 771. The pivoting portion 771 is disposed between the support portions 752 of the support member 75, and the shaft portions 762 of the torque hinges 76 protruding from the support portions 752 are fitted on the two sides of the pivoting portion 771. Also, as shown in FIG. 14, the pivoting member 771 is disposed so as to be exposed from the vicinity of the upper portion of the rear opening 74 of the above-described housing 100, and the second fixing tool 772 is disposed so as to be exposed from the vicinity of the lower portion of the rear opening 74. As shown in FIG. 10, when the pivoting member 771 pivots with respect to the support member 75, the second fixing tool 772 accommodated in the rear opening 74 protrudes outward from the rear opening 74.

Figure 15:
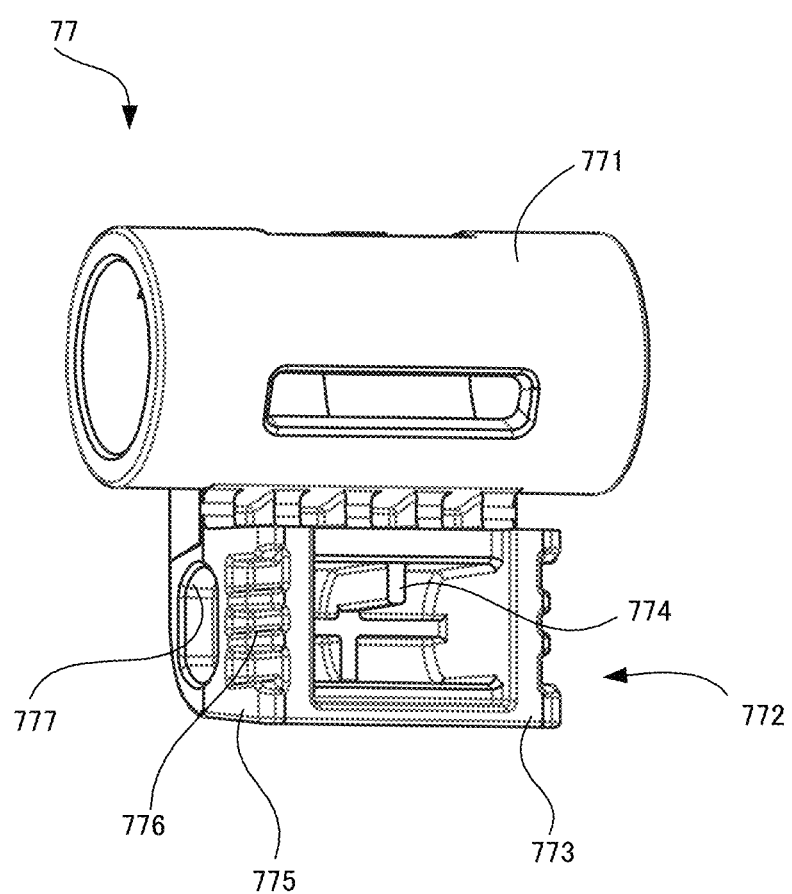
FIG. 15 is a perspective view of a pivoting member.

Next, the second fixing tool 772 will be described with reference to FIG. 15 as well. FIG. 15 is a perspective view of the pivoting member. As shown in FIG. 15, the second fixing tool 772 has a frame member 773 that is formed in a rectangular frame shape, and this frame member 773 is configured to be open outward in a state shown in FIG. 14 in which the second fixing tool 772 is accommodated in the opening 74. A plate-shaped positioning portion 774 extending in the front-back direction is formed at the center in the left-right direction in the inner portion of the frame member 773. Also, each of the outer side surfaces 775 of the frame member 773 in the left-right direction is provided with an inclined portion 776 that inclines so as to extend inward from the front end opening of the frame member 773 while extending in the left-right direction. Further, a portion of each outer side surface 775 that is inward of the inclined portion 776 is provided with a recessed portion 777, and a protrusion 142 of a fixing piece 141, which will be described later, is fitted to this recessed portion 777.

Figure 16:
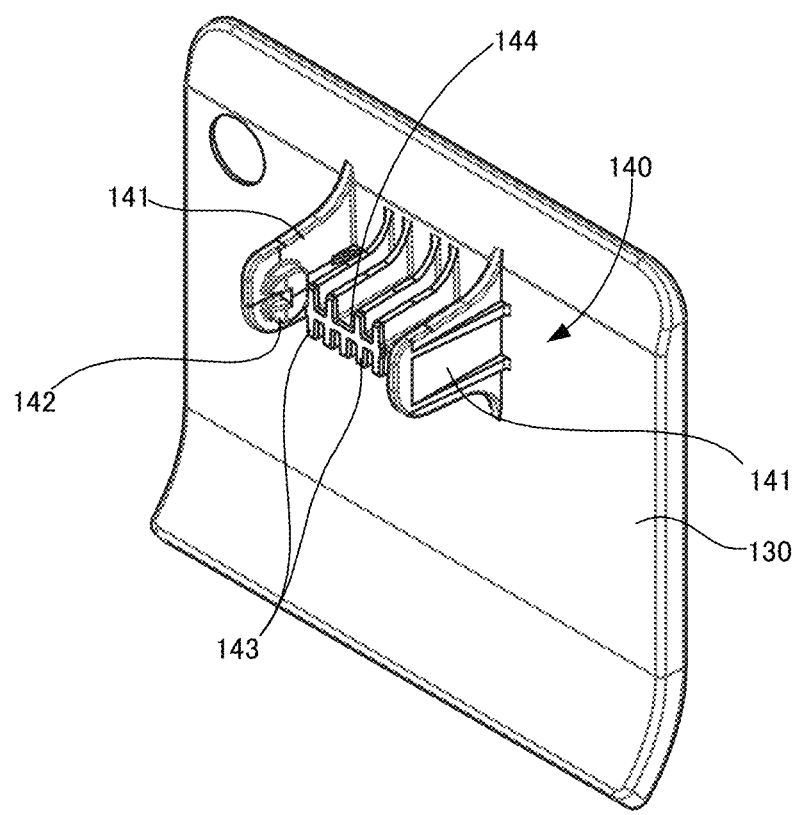
FIG. 16 is a perspective view of the stand member.
Figure 17:
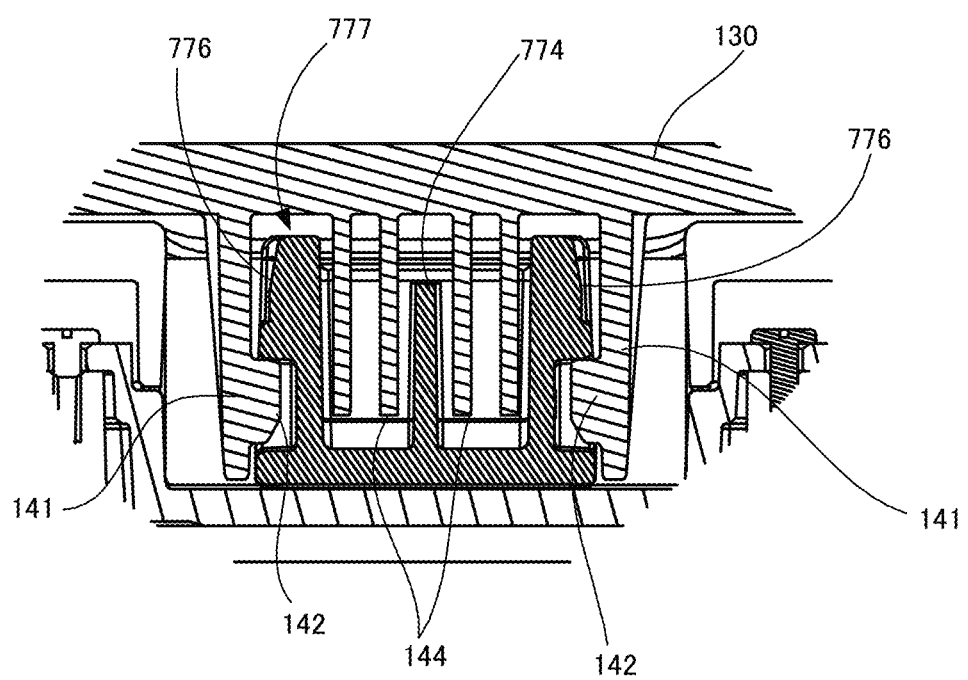
FIG. 17 is a cross-sectional view showing a state where a first fixing tool and a second fixing tool are fixed.

Next, the first fixing tool 140 of the stand member 130 that is fixed to this second fixing tool 772 will be described with reference to FIGS. 16 and 17. FIG. 16 is a perspective view of the stand member, and FIG. 17 is a cross-sectional view showing a state where the first fixing tool and the second fixing tool are fixed. As shown in FIG. 17, the first fixing tool 140 is disposed in the vicinity of the upper end portion of the front surface of the stand member 130, and the first fixing tool 140 includes a pair of plate-shaped fixing pieces (fixing portions) 141 configured to sandwich and fix the frame member 773 of the second fixing tool 772. The fixing pieces 141 protrude from the front surface of the stand member 130 so as to face each other. Further, the surfaces, which face each other, of the leading end portions of the fixing pieces 141 are provided with protrusions 142, and as shown in FIG. 17, the protrusions 142 are fitted to the recessed portions 777 of the second fixing tool 772.

Also, a plurality of protruding pieces 143 that are to be fitted to the frame member 773 of the second fixing tool 772 are formed between the two fixing pieces 141. These protruding pieces 143 are formed in plate-shapes arranged side-by-side in the left-right direction at predetermined intervals, and the protruding pieces 143 are linked together by the linking portion 144 extending in the left-right direction. Further, a positioning portion 774 of the above-described second fixing tool 772 is fitted between the protruding pieces 143. In this exemplary embodiment, four protruding pieces 143 are formed, and as shown in FIG. 17, the positioning portion 774 is fitted between two protruding pieces 143 at the center.

When the fixing pieces 141 of the first fixing tool 140 are fixed to the frame member 773 of the second fixing tool 772, the two fixing tools 140 and 772 are brought close to each other, and the protrusions 142 of the fixing tools 141 are slid on the inclined portions 776 of the frame member 773. When the protrusions 142 of the fixing pieces 141 pass the inclined portions 776, the protrusions 142 are fitted into the recessed portions 777 of the frame member 773. In this process, the protruding pieces 143 of the first fixing tool 140 are fitted into the frame member 773. When the protrusions 142 are fitted into the recessed portions 777 in this manner, the two fixing tools 140 and 772 are fixed to each other, and attachment of the stand member 130 to the housing 100 is complete.

Figure 18:
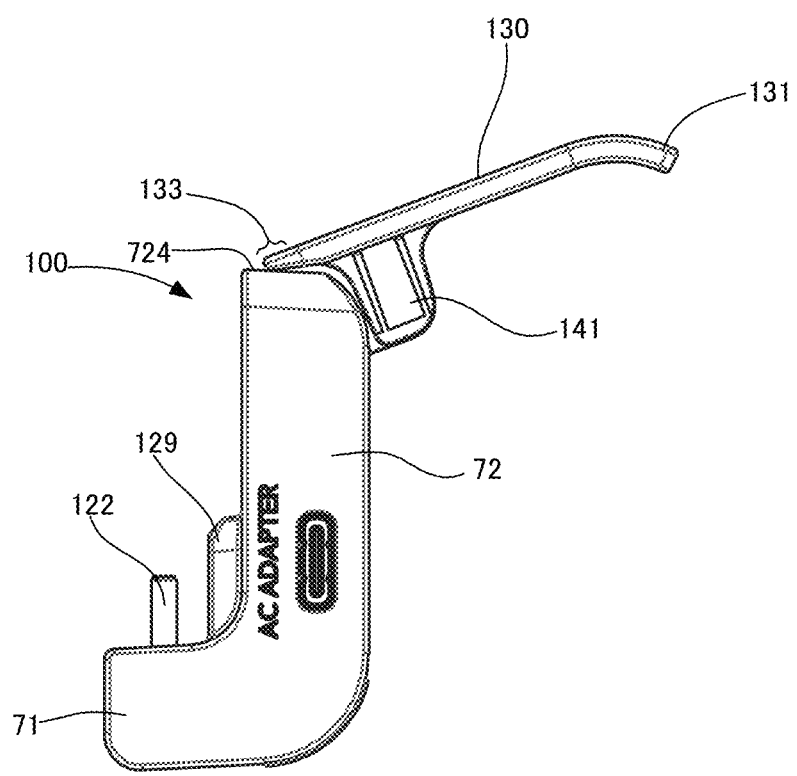
FIG. 18 is a side view showing a state where the stand member is pivoted upward.

It should be noted that the first fixing tool 140 is disposed in the vicinity of the upper end portion of the stand member 130, and thus the stand member 130 extends upward beyond the first fixing tool 140. As shown in FIG. 18, when the pivoting member 77 has pivoted to the uppermost position, the stand member 130 is approximately perpendicular to the extension portion 72, and when the stand member 130 has further pivoted upward, the upper end 132 of the stand member 130 is in contact with the upper surface 724 of the extension portion 72. When the stand member 130 is further pivoted upward, it pivots with the upper end portion 133 of the stand member 130 serving as the fulcrum on the upper surface 724 of the extension portion 72, and the state where the first and second fixing tools 140 and 772 are linked together is released. That is, the protrusions 142 of the two fixing pieces 141 separate from the recessed portions 777 of the frame member 773, and the protruding pieces 143 separate from the frame member 773. As a result, the stand member 130 separates from the housing 100.

2-1-3. Connector Support Member

Figure 19:
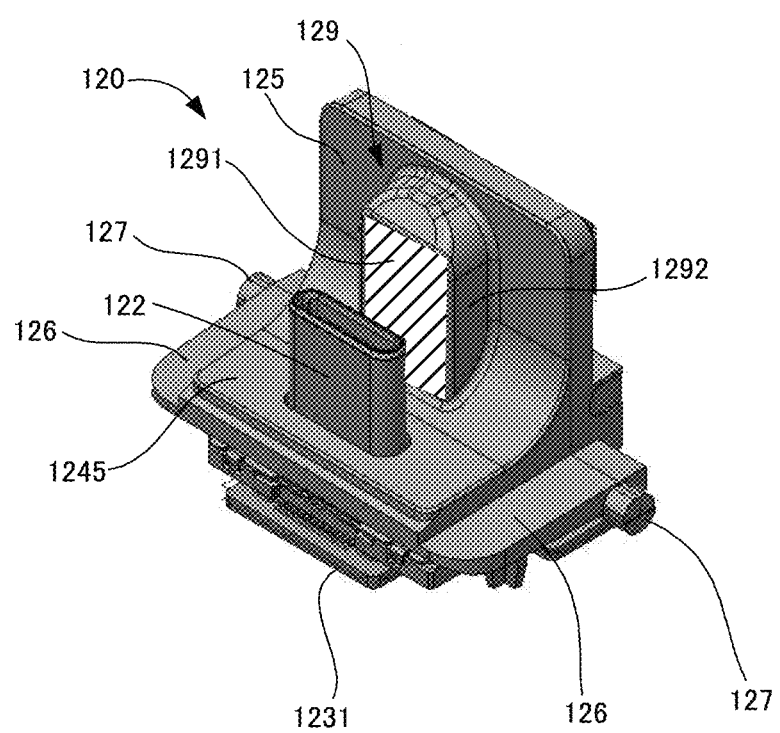
FIG. 19 is a perspective view of a connector support member.
Figure 20:
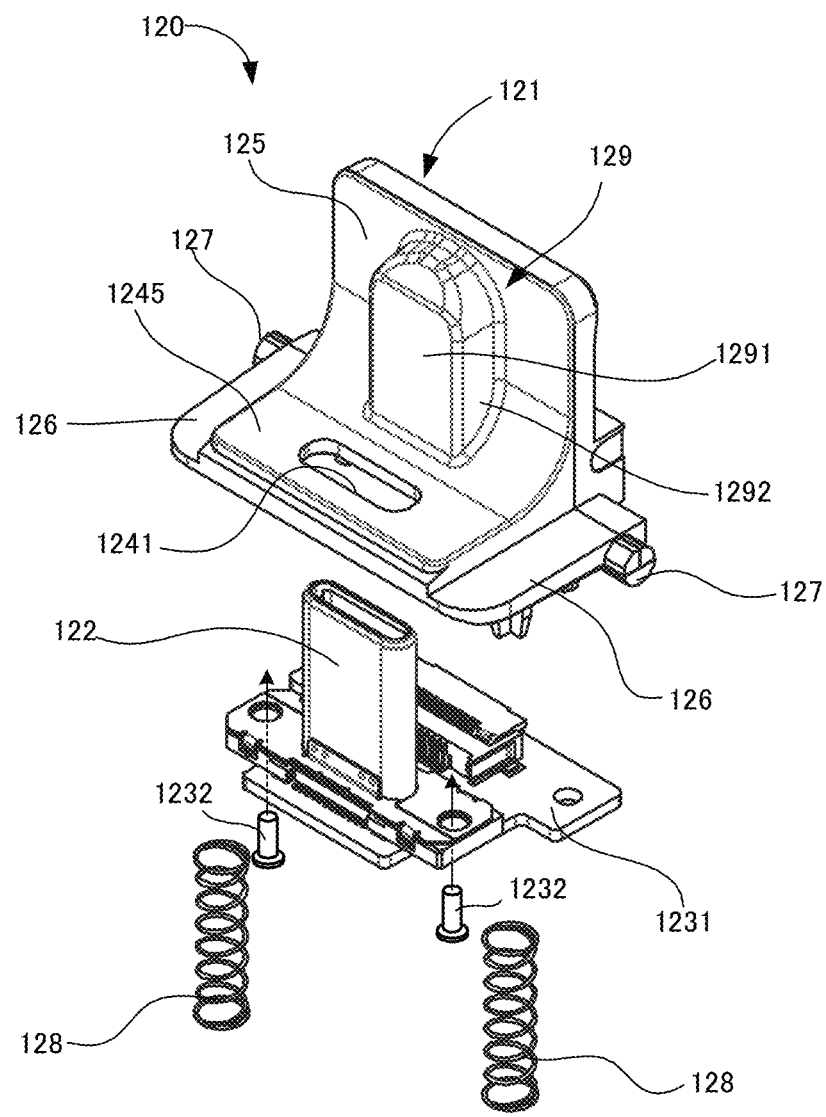
FIG. 20 is an exploded perspective view of the connector support member.
Figure 21:
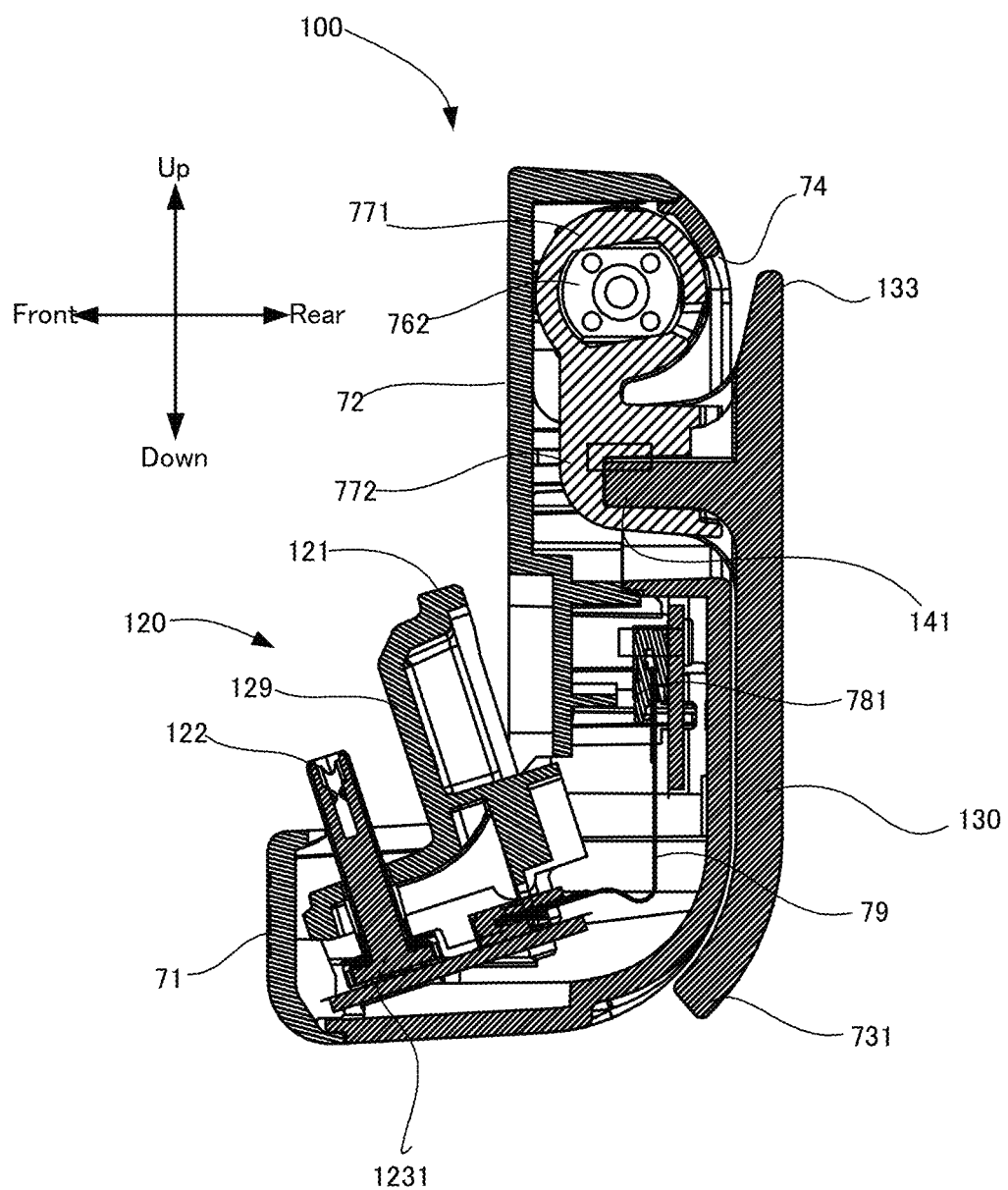
FIG. 21 is a cross-sectional view showing pivoting of the connector support member.

Next, the connector support member 120 will be described with reference to FIGS. 19 to 21. FIG. 19 is a perspective view of the connector support member, FIG. 20 is an exploded perspective view of the connector support member, and FIG. 21 is a cross-sectional view showing pivoting of the connector support member. As shown in FIGS. 19 and 20, the connector support member 120 includes a main body portion 121 that is fitted into the front opening 73 of the housing 100 and has an L-shape in a side view, a connector 122 protruding from this main body portion 121, and a first substrate 1231 connected to this connector 122.

The main body portion 121 includes a first site 1245 that is exposed from a through-hole of the upper surface 711 of the base portion 71 of the housing 100 and has a rectangular shape in plan view, and a second site 125 that is exposed from a through-hole of the front surface 721 of the extension portion 72 and has a rectangular shape in front view, and these sites are linked together to form an L-shape. A rectangular through-hole 1241 extending in the left-right direction is formed in the vicinity of the center of the first site 1245, and the connector 122 protrudes from this through-hole 1241. Further, at the initial position shown in FIG. 8 at which the main body portion 121 is fitted into the front opening 73, the upper surface of the first site 1245 and the upper surface 711 of the base portion 71 form an approximately continuous surface, and the front surface of the second site 125 and the front surface 721 of the extension portion 72 also form an approximately continuous surface. Also, plate-shaped retaining portions 126 extending in the front-back direction are formed on respective sides of the first site 1245. The retaining portions 126 are provided below the upper surface of the first site 1245, and are configured to engage with the inner surface of the housing 100 on respective sides of the front opening 73. Thus, the retaining portions 126 prevent the main body portion 121 from coming out upward from the front opening 73.

The rear ends of the retaining portions 126 are each provided with a shaft portion (first axis line) 127 that protrudes in the left-right direction, and this shaft portion 127 is pivotably attached to the inner surface of the base portion 71, that is, a bearing (not shown) provided on the inner surface of the front panel 100B. That is, the shaft portion 127 is disposed rearward of the connector 122. Also, springs (elastic members) 128 are attached to the two ends of the lower surface of the first site 1245, and each spring 128 is supported between the lower surface of the first site 1245 and a lower portion of the internal space of the base portion 71. Thus, although the main body portion 121 is pressed upward by these springs 128, the main body portion 121 is held at the initial position by the retaining portions 126 engaging with the inner surface of the housing 100. If an external force is applied downward to the main body portion 121, the connector 122 pivots downward from the initial position about the shaft portions 127 that serve as the pivoting centers.

Also, the above-described first substrate 1231 is fixed to the lower surface of the first site 1245 by screws 1232 (see FIG. 20), and the connector 122 is fixed to this first substrate 1231. Also, as described above, the connector 122 attached to the first substrate protrudes upward from the through-hole 1241 of the first site. As described above, this connector 122 is inserted into the female connector 27 of the game system 1.

The connector 122 extends in the left-right direction and is thin in the front-back direction, is formed in a flattened rectangular parallelepiped shape having a front surface and a back surface 1221 (see FIG. 23), and is electrically connected to the first substrate 1231. A rear end portion of the first substrate 1231 is disposed at approximately the same position as the shaft portions 127 of the main body portion 121 in the front-back direction, and a deformable belt-shaped cable is connected to the rear end portion of the first substrate 1231. It should be noted that a USB terminal can be adopted as such a connector 122.

Also, the front surface of the second site 125 is provided with a guide portion 129 extending upward from the portion at which the first site 1245 and the second site 125 are linked together. This guide portion 129 is formed in a rectangular parallelepiped shape protruding forward from the front surface of the second site 125, and a front surface of this guide portion 129 constitutes a facing surface 1291 (hatched portion in FIG. 19) that is parallel to the back surface 1221 of the connector 122. Also, in the guide portion 129, side surfaces (contact surfaces) 1292 oriented in the left-right direction are formed on the two sides of the facing surface 1291. This guide portion 129 is fitted to the groove 29 of the above-described game system 1.

More specifically, insertion of the guide portion 129 into the groove 29 guides the connector 122 so as to be inserted into the female connector 27. Thus, the distance between the female connector 27 and the bottom surface 291 of the groove 29 in the game system 1 is the same as or slightly smaller than the distance between the connector 122 and the facing surface 1291. Also, the height of the guide portion 129 protruding from the front surface of the second site 125 is substantially the same as the depth of the groove 29, and the width of the guide portion 129 in the left-right direction is the same as or slightly smaller than the width of the groove 29. Further, the distance between the female connector 27 and the back surface of the game system 1 is substantially the same as the distance between the connector 122 and the front surface of the second site 125. When the connector 122 is inserted into the female connector 27, the guide portion 129 is fitted to the groove 29 of the game system 1 due to such a configuration. Accordingly, the facing surface 1291 faces the bottom surface 291 of the groove 29, that is, the back surface of the game system 1.

As shown in FIG. 21, if an external force is applied downward to the connector 122, the connector 122 pivots together with the main body portion 121 and the first substrate 1231 due to the above-described configuration. At this time, because the shaft portions 127 are disposed rearward of the connector 122, the connector 122 pivots such that the connector support member 120 sinks downward from the upper surface 711 of the base portion 71 while the upper end of the connector 122 is tilted forward.

Also, as shown in FIG. 12, when the connector 122 is located at the initial position, the connector is disposed so as not to protrude from a virtual plane Z that connects the front end of the upper surface 711 of the base portion 71 of the housing 100 and the upper end of the front surface 721 of the extension portion 72.

2-1-4. Structure for Charging

Figure 22:
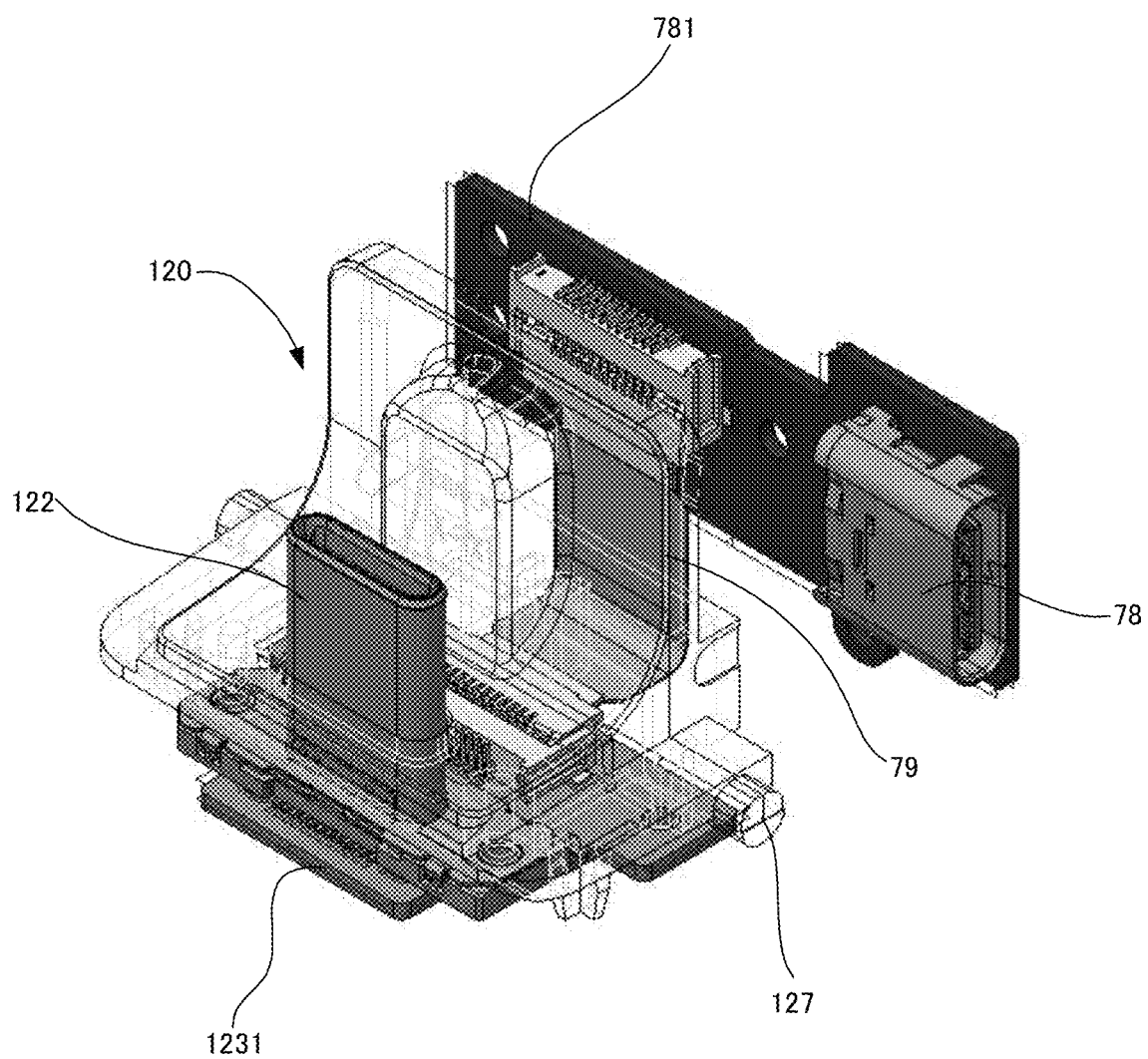
FIG. 22 is a perspective view showing an electrical structure inside the housing together with the connector support member.

Subsequently, the structure for charging will be described with reference to FIG. 22 as well. FIG. 22 is a perspective view showing the electrical structure inside the housing together with the connector support member. As shown in FIG. 8, the side surface 726 of the extension portion 72 is provided with a side surface opening 725 for an external terminal for connecting an external device. As shown in FIG. 22, an external terminal 78 is provided inside the housing 100 in correspondence with this side surface opening 725. This external terminal 78 is a female terminal, and is fixed to a second substrate 781 disposed in the housing 100. As shown in FIG. 14, the second substrate 781 is fixed to the inside of the extension portion 72, and accordingly, the opening of the external terminal 78 is supported so as to coincide with the side surface opening 725 of the extension portion 72. Also, as shown in FIG. 22, the external terminal 78 and the second substrate 781 are electrically connected to each other, and the second substrate 781 and the above-described first substrate 1231 are electrically connected by a flexible flat cable (FFC) 79. Thus, when the first substrate 1231 is pivoted together with the connector support member 120, the FFC 79 deforms due to this pivoting.

A charging device 1000 according to the exemplary embodiment charges the game system 1 connected to the connector 122, by a cable (not shown) connected to the external terminal 78. Thus, processing for charging is performed by various electronic circuits disposed in the first substrate 1231 and the second substrate 781.

3. Method for Using Charging Device 3-1. Method for Attaching Game System

Figure 23:
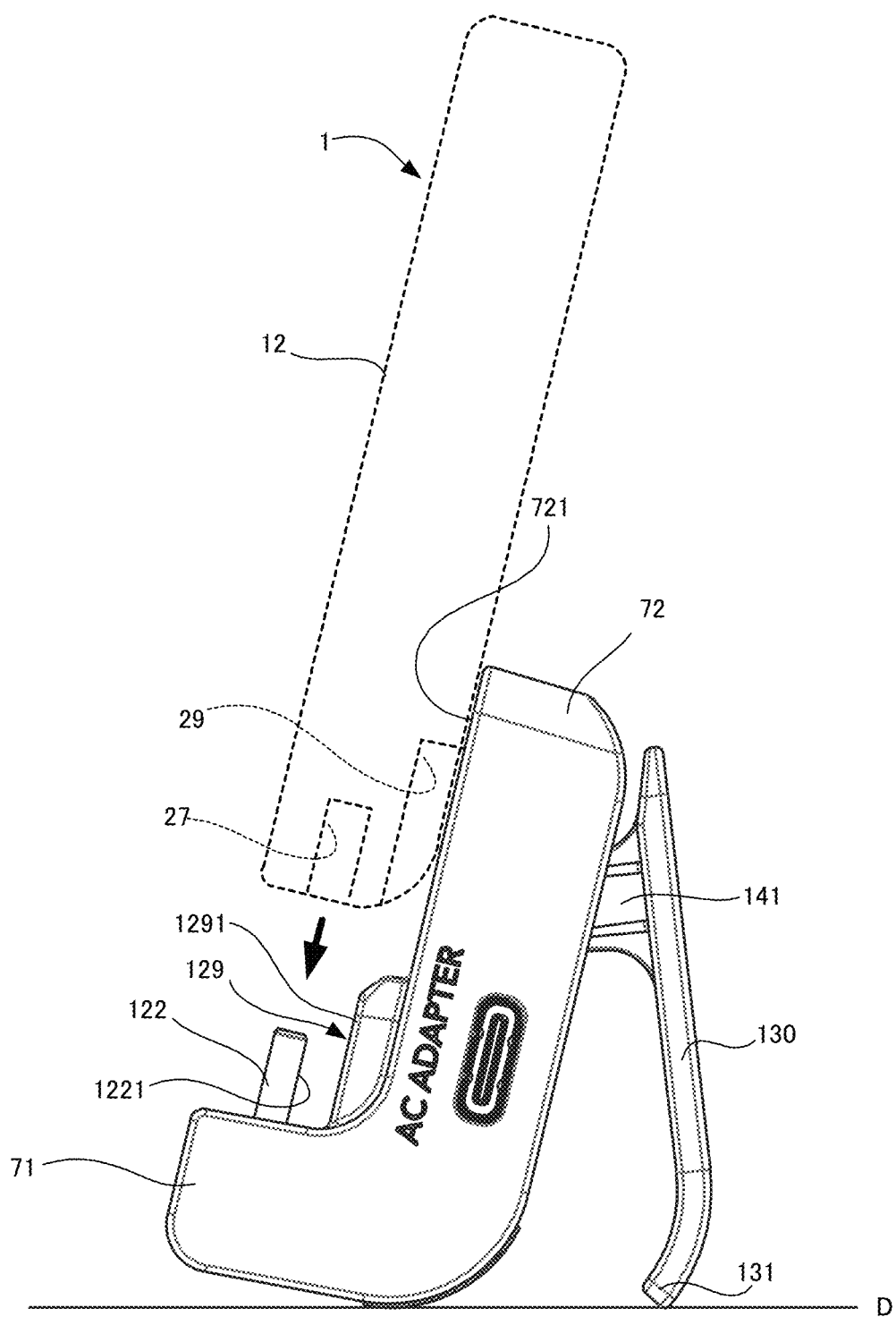
FIG. 23 is a cross-sectional view showing a method for attaching the game system to the charging device.
Figure 24:
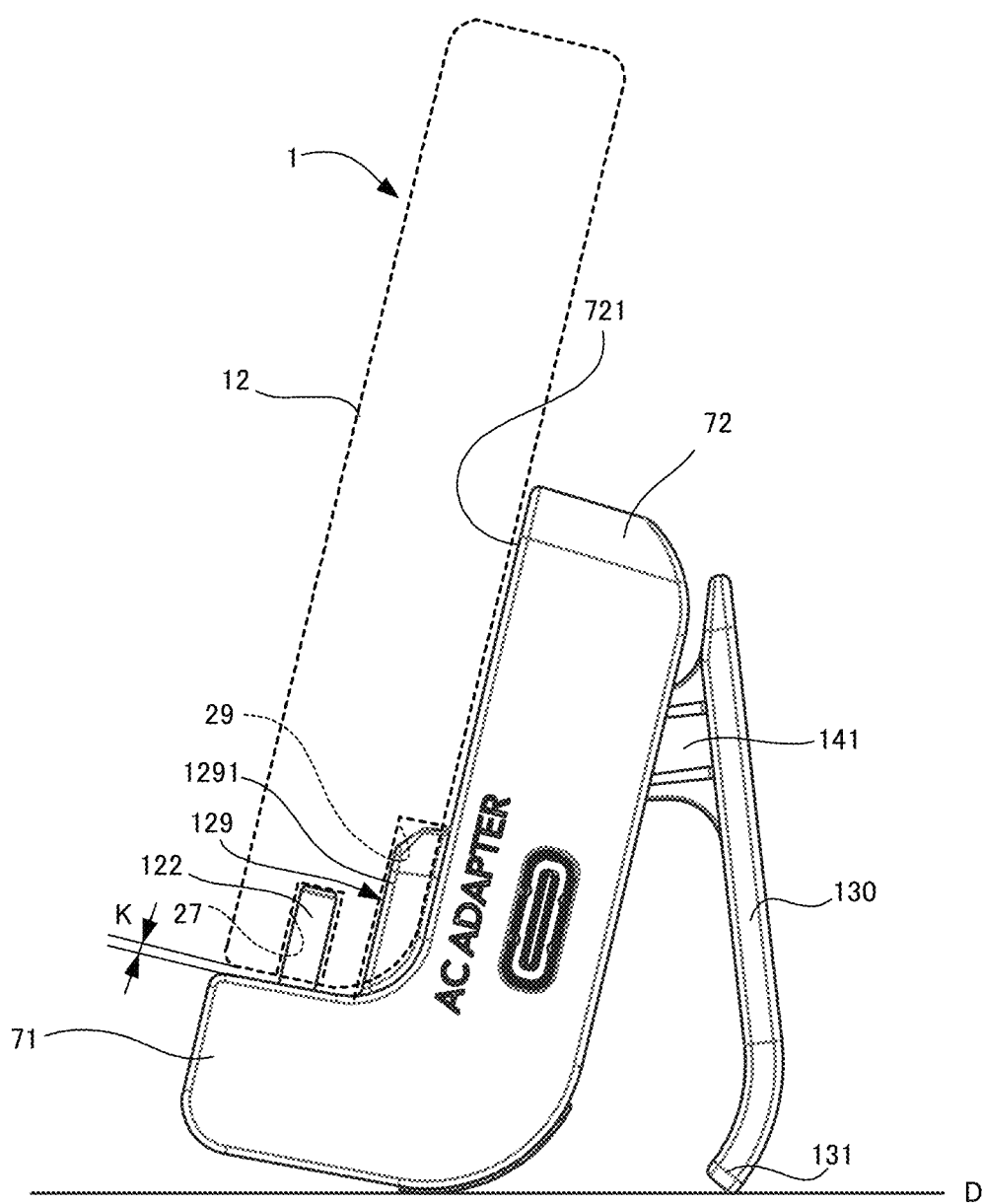
FIG. 24 is a cross-sectional view showing a method for attaching the game system to the charging device.
Figure 25:
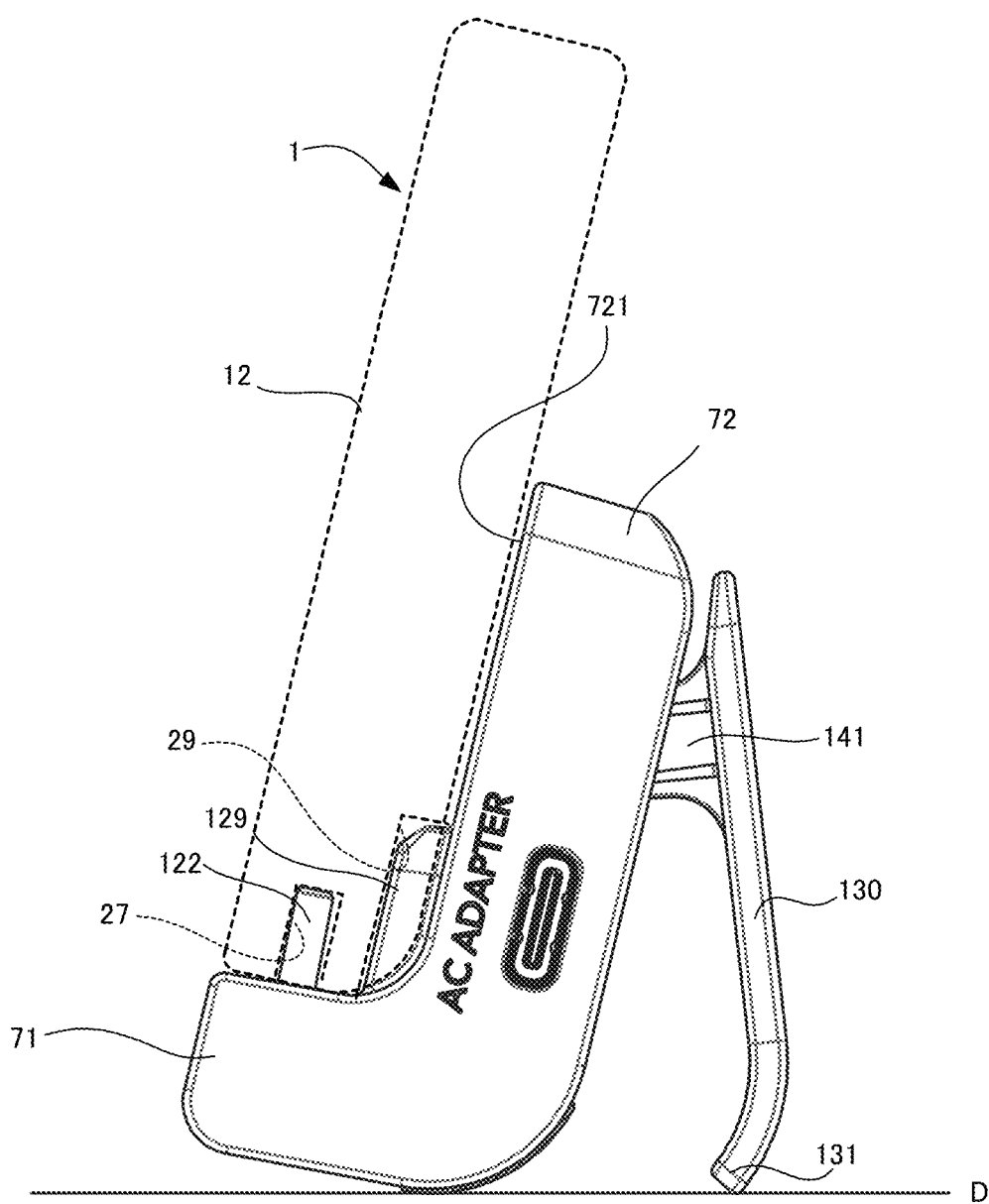
FIG. 25 is a cross-sectional view showing a method for attaching the game system to the charging device.

Next, a method for using the charging device 1000 configured as described above will be described with reference to FIGS. 23 to 25. FIGS. 23 to 25 are cross-sectional views showing the method for attaching the game system to the charging device. First, a method for disposing the game system 1 in the charging device 1000 will be described. First, as shown in FIG. 12, the stand member 130 is pivoted, the angle between the housing 100 and the stand member 130 is determined as appropriate, and the charging device 1000 is installed on the installation surface D. That is, the lower surface 722 of the housing 100 and the lower end portion 131 of the stand member 130 are in contact with the installation surface D. Also, a cable (not shown) connected to a power source is connected to the external terminal 78.

Next, as shown in FIG. 23, the display 12 on the front surface of the game system 1 is turned forward, and the orientation of the game system 1 is determined such that the back surface of the game system 1 and the front surface 721 of the extension portion 72 face each other. Next, the game system 1 is moved downward such that the connector 122 is inserted into the female connector 27 of the game system 1. In this process, if the game system 1 is lowered such that the back surface of the game system 1 moves along the front surface 721 of the extension portion 72, the guide portion 129 of the charging device 1000 is fitted into the groove 29. Accordingly, the position of the game system 1 is determined (guided) with respect to the charging device 1000 in the left-right direction. If the game system 1 is further lowered, the game system 1 moves downward while being guided by the guide portion 129, and the connector 122 is inserted into the female connector 27.

Figure 26:
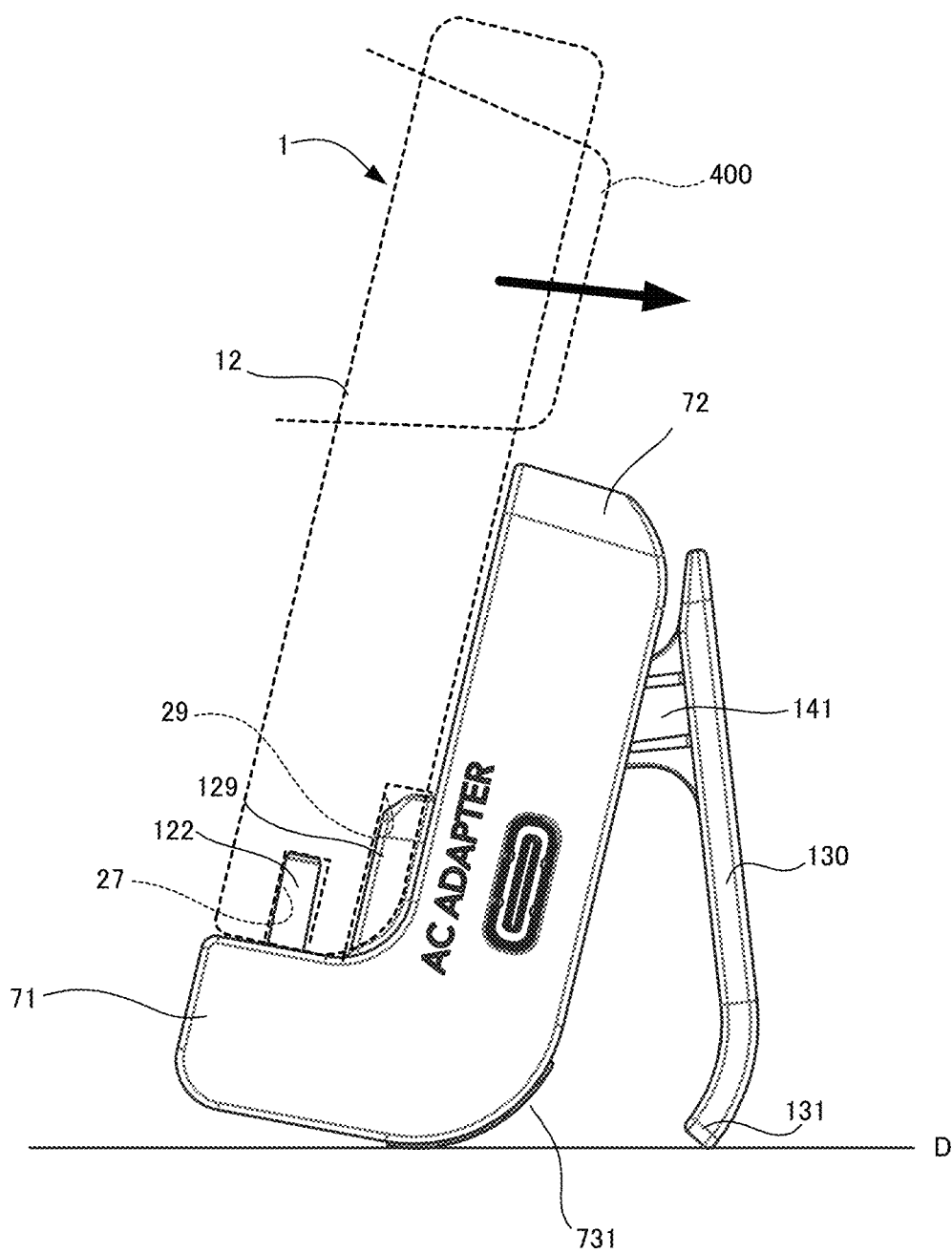
FIG. 26 is a cross-sectional view showing a method for adjusting the angle of the stand member.

As shown in FIG. 24, when the front end of the connector 122 reaches a deep-end portion of the female connector 27, a small gap K is formed between the lower surface of the game system 1 and the upper surface 711 of the base portion 71. Thereafter, the connector support member 120 is pushed downward due to the weight of the game system 1 in a state where the connector 122 is inserted into the female connector 27, and as shown in FIG. 26, the lower surface of the game system 1 comes into contact with the upper surface 711 of the base portion 71. The game system 1 is supported by the charging device 1000 in this manner. In this process, when pressed by the game system 1, the connector support member 120 slightly pivots downward about the shaft portions 127 that serve as the pivoting centers.

On the other hand, because the connector support member 120 is pushed upward by the springs 128, in other words, because the connector support member 120 is biased upward, the front end of the connector 122 is still kept in contact with the deep-end portion of the female connector 27. In this manner, the game system 1 is charged.

3-2. Method for Adjusting Angle

Figure 27:
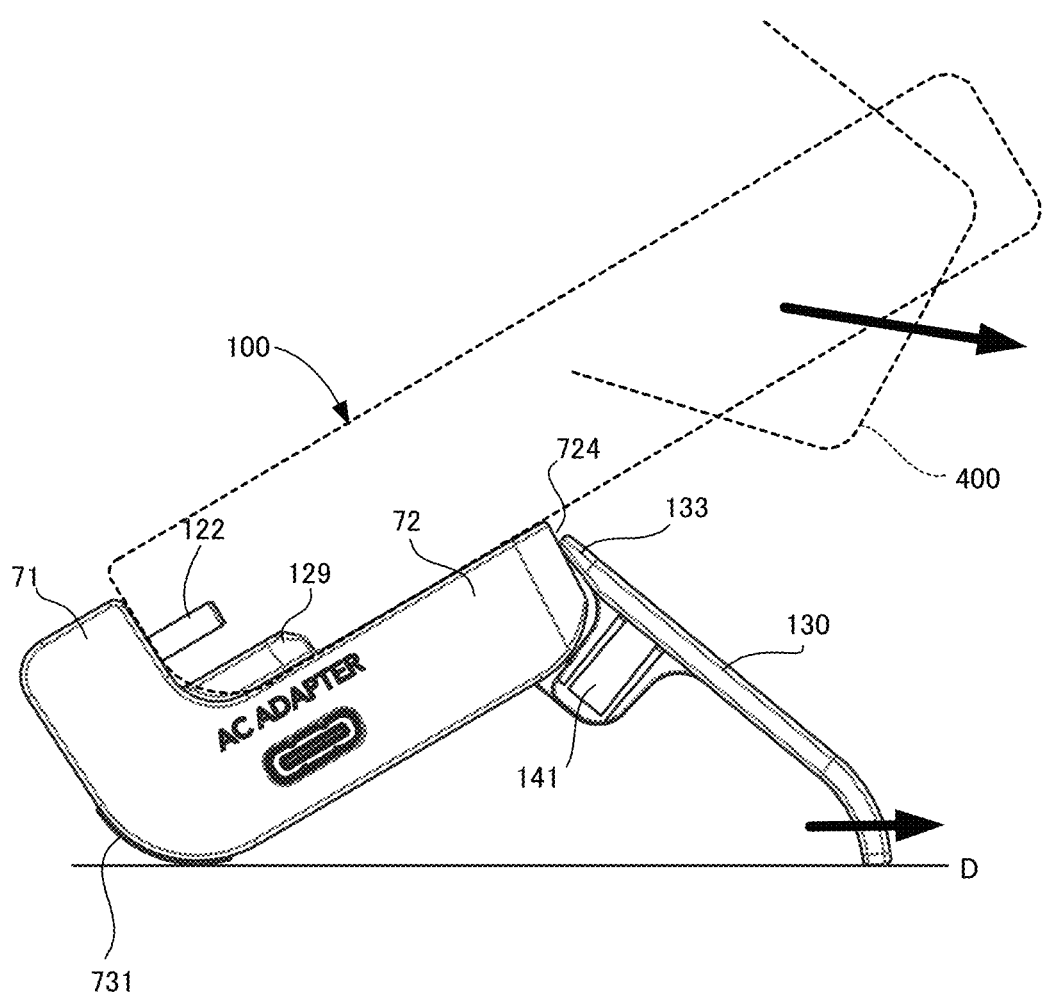
FIG. 27 is a cross-sectional view showing a method for adjusting the angle of the stand member.

Subsequently, a method for adjusting the angle of the stand member will be described with reference to FIGS. 26 and 27 as well. FIGS. 26 and 27 are cross-sectional views showing the method for adjusting the angle of the stand member. The angle of the stand member 130 may be adjusted by pivoting the stand member 130 held with a hand 400, or the angle may also be adjusted as follows. First, in the state shown in FIG. 26, the upper end portion of the game system is tilted rearward while the housing 100 is pressed against the installation surface D via the game system 1 in a state where both sides of the game system 1, that is, the left and right controllers 3 and 4, are held with hands. Accordingly, the housing 100 is tilted rearward with the anti-slip members 731 on the lower surface 722 of the housing 100 serving as fulcrums. Along with this, the lower end portion 131 of the stand member 130 slides on the installation surface D, and the distance between the lower end portion 131 of the stand member 130 and the lower surface 722 of the housing 100 increases. That is, as shown in FIG. 27, the stand member 130 pivots such that the angle of the stand member 130 increases with respect to the housing 100. Accordingly, the inclination of the housing 100 can be adjusted. At this time, the anti-slip members 731 on the lower surface 722 of the housing 100 serve as the fulcrums, and thus the housing 100 does not slide on the installation surface D, only the stand member 130 slides, and the angle of the stand member 130 increases. In this manner, the game system 1 is pressed until the stand member 130 reaches a desired angle. Thereafter, a game can also be played.

It should be noted that with the game system according to the exemplary embodiment, because the controllers 3 and 4 can be detached from the main body apparatus 2, only the main body apparatus 2 is disposed in the charging device 1000, and the angle of the housing 100 can also be adjusted with one hand as described above in a state where the controllers 3 and 4 are held with the other hand.

3-3. Method for Detaching Game System

Figure 28:
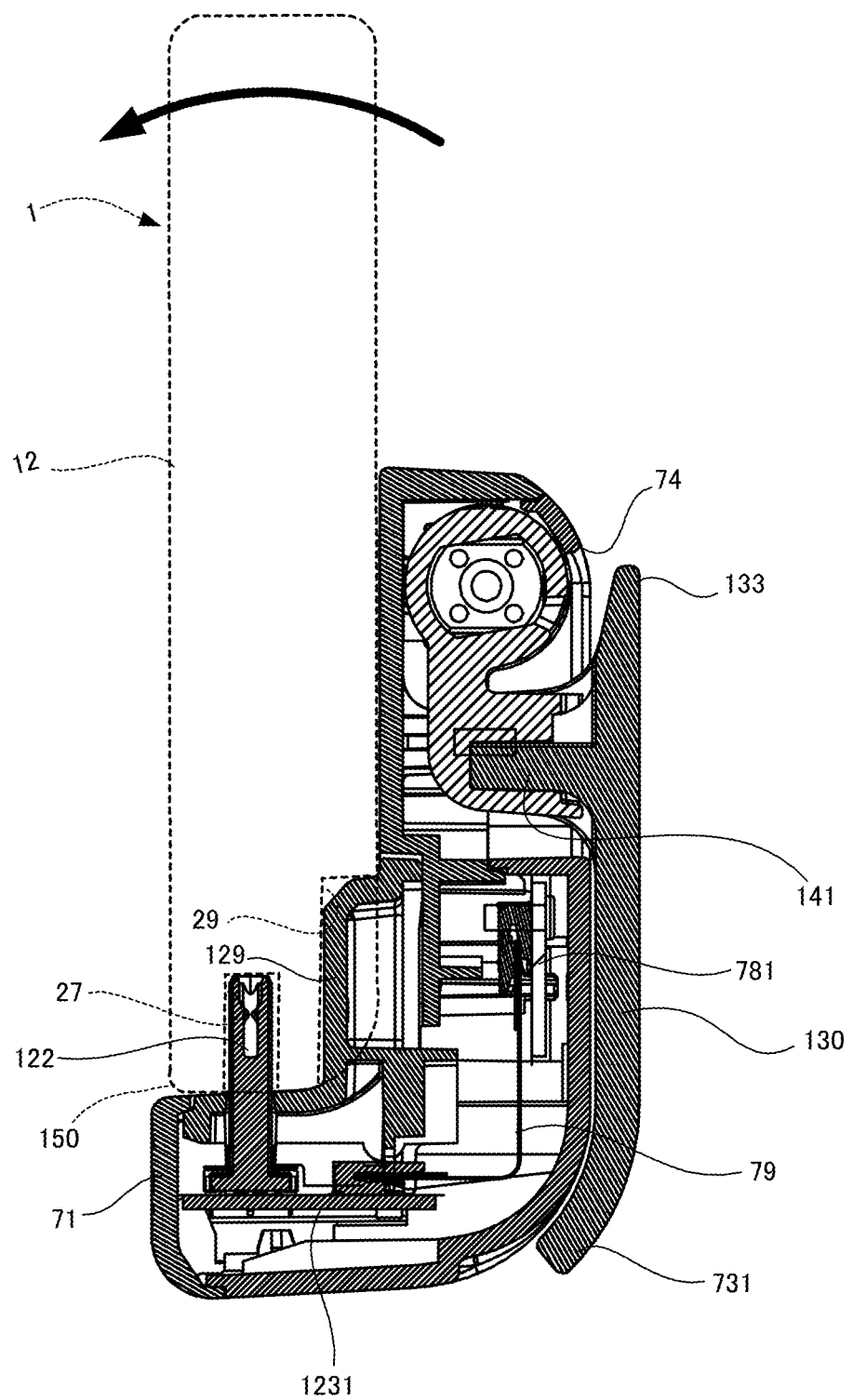
FIG. 28 is a cross-sectional view showing a method for detaching the game system from the charging device.

In order to detach the game system 1 from the charging device 1000, it is sufficient to pull up the game system. 1 along the direction in which the connector 122 extends, and the game system 1 can also be detached as follows. That is, the game system 1 can also be pulled out from the connector 122 while the upper end of the game system 1 is tilted forward. For example, as shown in FIG. 28, if the upper end portion of the game system 1 is held and tilted forward, a corner portion 150, which is a border portion between the front surface and the lower surface of the game system 1 (that is, a portion at which the front surface and the lower surface of the game system 1 intersect with each other), comes into contact with a portion of the upper surface (support surface) of the base portion 71, and this corner portion 150 serves as the fulcrum and the game system 1 is tilted. The game system 1 is stably tilted (pivots) by tilting the game system 1 about such a fulcrum without sliding. The connector support member 120 pivots forward about the shaft portions 127 along with this. That is, because the connector 122 is inserted into the game system 1, the connector 122 is tilted together with the game system 1, and the connector support member 120 pivots along with this. At this time, the connector support member 120 pivots such that the connector 122 sinks into the upper surface 711 of the base portion 71. Thus, the connector 122 gradually escapes from the female connector 27 by tilting the game system 1.

Figure 29:
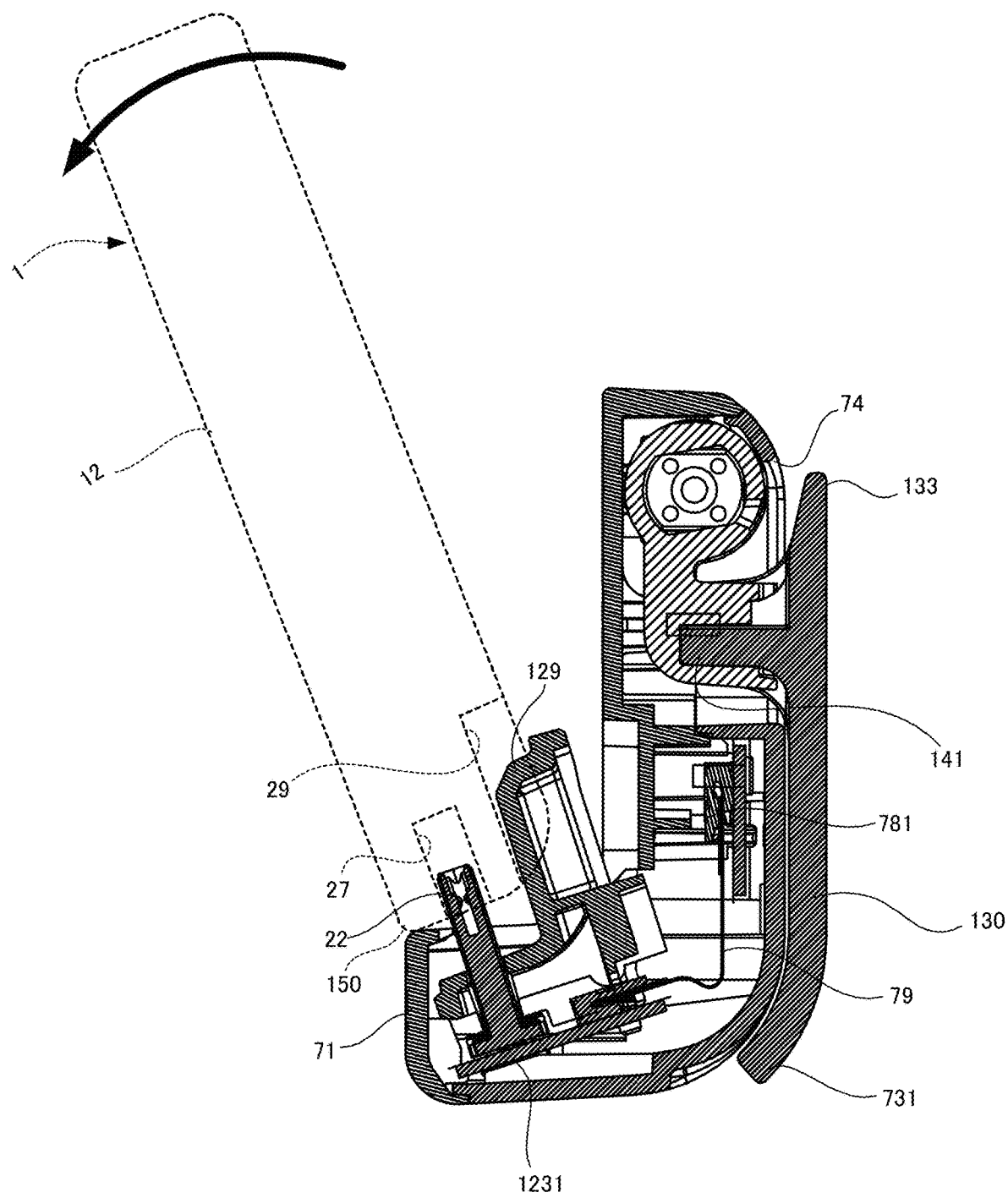
FIG. 29 is a cross-sectional view showing a method for detaching the game system from the charging device.

Then, as shown in FIG. 29, as tilting of the game system 1 advances, the connector 122 approximately escapes from the female connector 27, and thus if the game system 1 is further tilted, the connector 122 is unlikely to be caught on the female connector 27, and the game system 1 can be detached from the charging device 1000.

4. Characteristics

According to the charging device of the exemplary embodiment, the following effects can be obtained.

(1) The connector support member 120 pivots about the shaft portions 127 as the pivoting centers that are located rearward of the connector 122, and thus the connector 122 is configured to move downward while tilting such as the upper end portion of the connector 122 tilts and falls forward. Thus, if a user attempts to detach the game system. 1 from the charging device 1000 while tilting the game system 1 forward in a state where the game system 1 is inserted into the connector 122, the connector 122 separates from the female connector 27 while being tilted together with the game system 1. Thus, even in the case where attempts are made to detach the game system 1 from the charging device 1000 while tilting the game system 1 forward, it is possible to reduce the possibility that an unnecessary load will be applied to the connector 122.

(2) Because the facing surface 1291 disposed rearward of the connector 122 is parallel to the direction in which the connector 122 protrudes, when the connector 122 is inserted into the female connector 27, the bottom surface 291 of the groove 29 of the game system. 1 can be guided by the facing surface 1291 in the up-down direction. At this time, the distance between the connector 122 and the facing surface 1291 corresponds to the distance between the female connector 27 and the bottom surface 291 of the groove 29, and thus it is possible to easily determine the position of the connector 122 in the front-back direction with respect to the female connector 27. Thus, because the game system 1 can be moved downward in parallel to the connector 122, the connector 122 can be easily inserted. Further, because the distance between the connector 122 and the front surface of the second site 125 also corresponds to the distance between the female connector 27 and the back surface of the game system 1, this aspect also contributes to determining the position of the game system. 1 in the front-back direction, and makes the insertion of the connector 122 easy.

Also, when the connector 122 is inserted into the female connector 27, force is applied to the connector 122 in the insertion process, and there is a possibility that the connector 122 will pivot. If the connector 122 pivots in this manner, there is a possibility that the connector 122 will be caught on the inner portion of the female connector 27, and the connector 122 will not be smoothly inserted. However, in the exemplary embodiment, when the connector 122 pivots at the time of insertion of the connector 122, the facing surface 1291 that is parallel to the back surface 1221 of the connector 122 comes into contact with the groove 29 of the game system 1, restricting pivoting of the connector 122. Thus, the connector 122 can be smoothly inserted.

Also, because the guide portion 129 is provided in the connector support member 120, the guide portion 129 can pivot together with the connector 122. Thus, for example, even if the connector 122 pivots by being pressed by the game system 1 immediately before the insertion of the connector 122, the positional relationship between the connector 122 and the facing surface 1291 does not change. Thus, if the game system 1 is moved so as to be aligned with the facing surface 1291, even if the connector 122 pivots, the connector 122 can be easily inserted into the female connector 27.

Furthermore, the two side surfaces 1292 of the guide portion 129 are configured to come into contact with the two side surfaces 292 in the groove 29, and thus the position of the game system. 1 in the left-right direction can be determined (guided) by the guide portion 129. Thus, this also makes it possible to easily insert the connector 122 into the female connector 27 of the game system 1.

(3) The above-described exemplary embodiment has a configuration in which, when the connector 122 is inserted into the female connector 27, the connector 122 pivots and the lower surface of the game system 1 comes into contact with the upper surface 711 of the base portion 71 due to the weight of the game system 1 after the connector 122 comes into contact with the deep-end portion of the female connector 27. Thus, for example, even in the case where, when current flows between the connector 122 and the female connector 27, the effective fitting length is short, it is possible to reliably cause current to flow between the connector 122 and the female connector 27.

In particular, because the connector support member 120 is pushed upward by the springs 128, the front end of the connector 122 is kept in contact with the deep-end portion of the female connector 27. Thus, it is possible to maintain the state where current flows between the connector 122 and the female connector 27.

(4) The FFC 79 extends from the rear end portion of the first substrate that supplies power to the connector 122, and the shaft portions 127 are located in the vicinity of the rear end portion of the first substrate 1231. That is, the shaft portions 127 that are the pivoting centers are located near the portion at which the connector 122 and the FFC 79 are connected to each other, and thus even if the first substrate 1231 pivots, the portion at which the first substrate 1231 and the FFC 79 are connected to each other is unlikely to move. Thus, it is possible to reduce failure such as the FFC 79 coming off from the first substrate 1231 due to the FFC 79 excessively moving.

It should be noted that there is no particular limitation on the connection position of the FFC 79, and the FFC 79 may be directly connected to the first substrate 1231, or may be connected to the rear end portion of the first substrate 1231 via another connection member.

Figure 30:
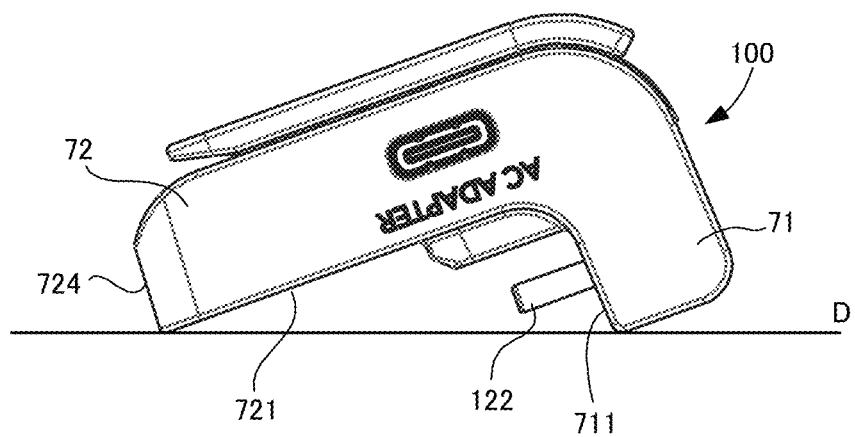
FIG. 30 is a side view showing an effect of a positional relationship between the housing and the connector.

(5) Because the connector 122 is disposed so as not to protrude from the virtual plane Z that connects the front end of the upper surface 711 of the base portion 71 of the housing 100 and the upper end of the front surface 721 of the extension portion 72, for example, as shown in FIG. 30, if the housing 100 is disposed such that the upper surface 711 of the base portion 71 faces the installation surface D, the connector 122 is not in contact with the installation surface D. Thus, even in the case where the housing 100 is installed as in FIG. 30, it is possible to prevent the connector 122 from coming into contact with the installation surface D and being damaged.

Figure 31:
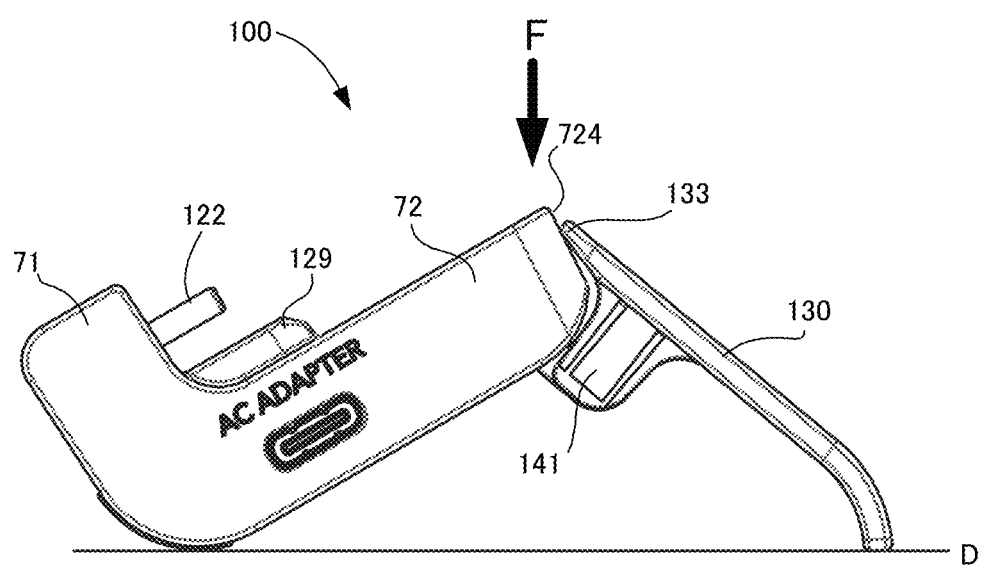
FIG. 31 is a side view illustrating separation of the stand member from the housing.

(6) Because the stand member 130 is configured to separate from the housing 100, if attempts are made to forcibly increase the angle of the stand member 130, or if the charging device is accidentally stepped on, it is possible to reduce the possibility that the stand member 130 and the housing 100 will be damaged. For example, if the upper end of the housing is stepped on in the state shown in FIG. 31, the stand member 130 pivots such that the angle of the stand member 130 with respect to the housing 100 increases due to the pressed force. Then, the angle of pivoting increases, and when the upper end 133 of the stand member 130 comes into contact with the upper surface 724 of the housing 100, the stand member 130 cannot pivot anymore. Further, if force is applied to further increase the pivoting angle of the stand member 130, the upper end portion of the stand member 130 serves as the fulcrum and the stand member 130 pivots, and the fixing pieces 141 of the stand member 130 separate from the frame member 773 of the second fixing portion 772 along with the pivoting.

Thus, when a strong force as described above is applied to the housing 100, the stand member 130 separates from the housing 100, and thus, it is possible to reduce the possibility of damage such as the case where cracking occurs in the portion at which the housing 100 and the stand member 130 are linked together. Further, even if the stand member 130 separates from the housing 100, the stand member 130 can be easily attached thereto again.

(7) The support member 75 and the pivoting member 77 of the linking mechanism are linked by the torque hinges 76, and repeatedly pivot, and thus they may be made of a material with high rigidity. An example of such a material with high rigidity is a resin material obtained by adding glass fibers to a resin such as a polyamide resin or polycarbonate. Thus, if the support member 75 and the the pivoting member 77 are made of such a material, it is possible to reduce the possibility that these members 75 and 77 will be damaged. However, it is not easy to color such a material, such as painting, and thus there is a risk that such a material will not provide the members with high aesthetic appearance. In view of this, only the support member 75 and the pivoting member 77 are made of a material with high rigidity, and a material with relatively high aesthetic appearance and somewhat low rigidity, such as an ABS resin or polycarbonate, may be used as the material for forming the housing 100 and the stand member 130 that are exposed to the outside. Accordingly, as described above, the support member 75 and the pivoting member 77 are accommodated in the housing 100, and only portions thereof are exposed to the outside, and thus a decrease in the aesthetic appearance of the housing 100 is suppressed. It should be noted that a metal material may be adopted as the material with high rigidity for constituting the support member 75 and the pivoting member 77, for example.

5. Variations

Although embodiments of the present disclosure have been described above, the present disclosure is not limited to the above-described exemplary embodiments, and various modifications can be made without departing from the spirit of the invention. Modifications such as the following can be made, for example. Also, variations below can be combined as appropriate.

(1) There is no particular limitation on the shape of the housing 100, and the shape of the exemplary embodiment is an example. Thus, the housing 100 may also have a shape other than the above-described L-shape in a side view as long as the game system 1 can be mounted, or may also have various shapes such as a shape in which the base portion and the extension portion simply intersect with each other. Also, the stand member 130 is not necessarily required, and it is sufficient that the housing 100 can be installed on the installation surface.

Figure 32:
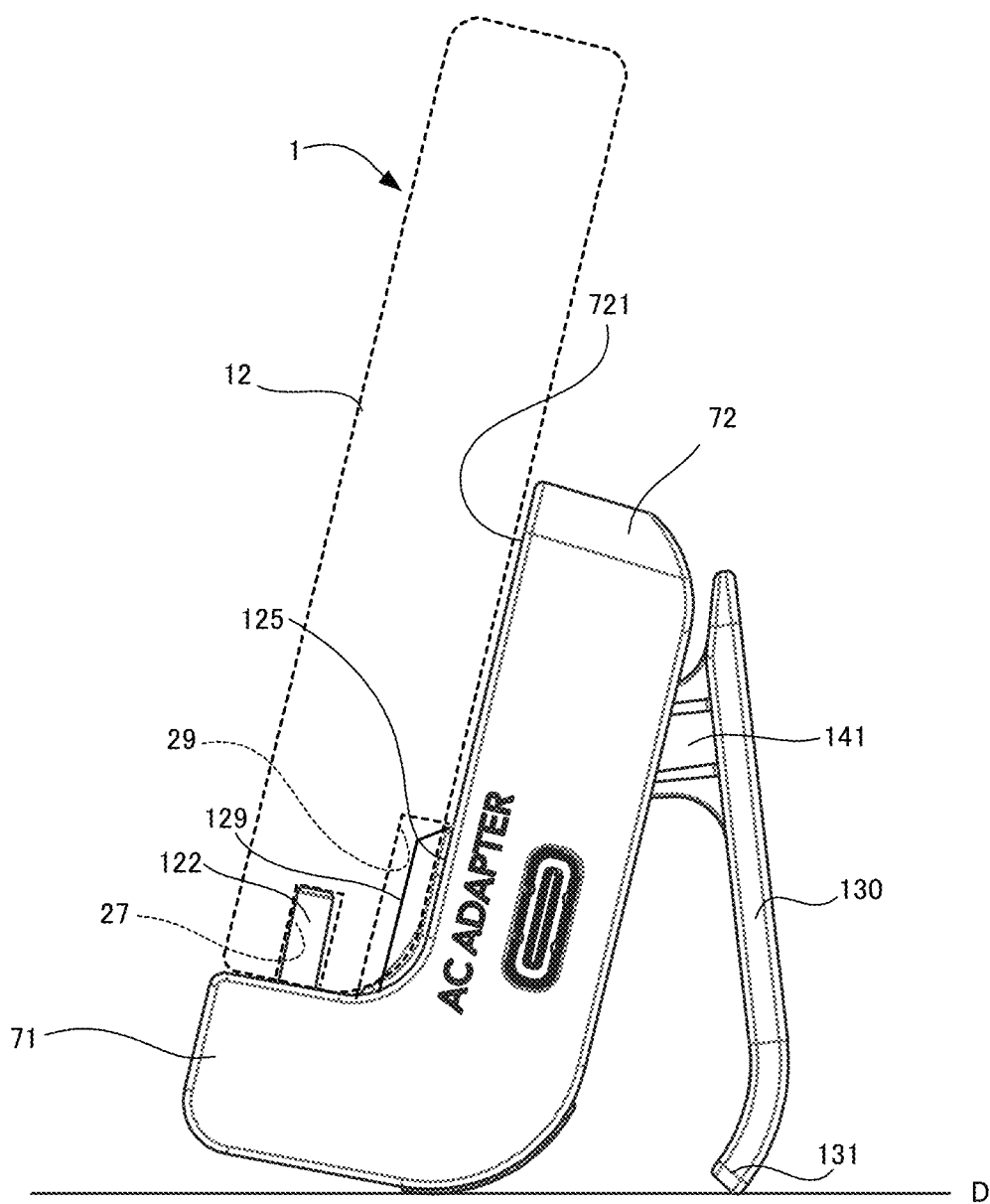
FIG. 32 is a side view of the charging device illustrating another example of a guide member.

(2) There is no particular limitation on the configuration of the guide portion 129 that is provided in the connector support member 120. For example, as shown in FIG. 32, if the guide portion 129 has a small protruding height, the front surface of the guide portion 129 does not come into contact with the bottom surface of the groove 29, and thus the front surface does not function as the facing surface of the present disclosure.

In this case, the front surface of the second site 125 (a surface to which the guide portion 129 is attached) may be used as the facing surface of the present disclosure, and the position of the game system 1 in the front-back direction with respect to the connector 122 can be determined, for example. That is, when the connector 122 is inserted into the female connector 27, the front surface of the second site 125 faces the back surface of the game system 1. Note that, even if the guide portion 129 has a low protruding height, the guide portion 129 still comes into contact with the side surfaces 292 of the groove 29, and thus the guide portion 129 is used to determine (guide) the position in the left-right direction.

Also, the guide portion may not have the facing surface 1291 as described above, and it is sufficient that the guide portion has various configurations (a recessed portion, a protruding portion, a groove, and the like) such that the guide portion guides the connector 122 to be inserted into the female connector 27. Further, a configuration may also be adopted in which such a guide portion pivots together with the connector 122.

(3) The above-described exemplary embodiment has a configuration such that the connector 122 is supported by the connector support member 120, and the connector 122 pivots. That is, the portion of this connector support member 120 that is configured to pivot the connector 122 corresponds to the pivoting mechanism of the present disclosure. However, there is no particular limitation on the configuration for pivoting the connector 122. The exemplary embodiment has a configuration in which the main body portion 121 of the connector support member 120 pivots, the connector 122 is supported by the first substrate 1231, and the first substrate 1231 is fixed to the main body portion 121. However, as a configuration other than this configuration, a member to which the connector 122 is fixed may be pivotably attached to the housing 100, for example.

Also, the positions of the pivoting centers (shaft portions 127) need only be located rearward of the connector 122, and are not required to be located downward of the portion of the connector 122 protruding outward from the housing 100, and are not particularly limited. For example, the pivoting center (first axis line) may be located above the portion of the connector 122 that protrudes outward from the housing 100. Also, the pivoting center may be disposed outside the housing 100. Further, the pivoting center may be the shaft portion 127 as described in the exemplary embodiment, or a configuration may be adopted in which a portion at which the members are linked together serves as the pivoting center without providing the pivoting center as a member, and pivots so as to be bent, or a configuration may be adopted in which pivoting is possible by a rail or the like.

Also, although the exemplary embodiment has a configuration in which the connector 122 pivots together with the main body portion 121, the first substrate 1231, and the FFC 79, it is sufficient that the present disclosure has a configuration in which at least only the connector pivots. Thus, the connector may also pivot by a member that supports only the connector. In this case, the first substrate may also be connected to the connector by an FPC, a lead wire, or the like, or the connector 122 may also be connected to another substrate or the external terminal 78.

Also, the connector support member 120 has the springs (elastic members) 128, but is not limited thereto, and may be another member as long as the connector 122 can be biased toward the initial position.

(4) As shown in FIG. 24, the exemplary embodiment has a configuration in which a gap K is formed between the lower surface of the game system 1 and the upper surface 711 of the base portion 71 when the front end of the connector 122 comes into contact with the deep-end portion of the female connector 27 in the process of inserting the connector 122, but the configuration is not limited thereto. That is, when the front end of the connector 122 comes into contact with the deep-end portion of the female connector 27, the lower surface of the game system 1 may also come into contact with the upper surface 711 of the base portion 71. Alternatively, although depending on the effective fitting length, the lower surface of the game system 1 may also come into contact with the upper surface 711 of the base portion 71 before the front end of the connector 122 comes into contact with the deep-end portion of the female connector 27.

(5) Although an example in which the electric conduction apparatus according to the present disclosure is a charging device was described in the exemplary embodiment, the electric conduction apparatus can also be used for various purposes other than charging an electronic device. That is, the electric conduction apparatus can be electrically connected to an external apparatus by replacing the substrates 1231 and 781 in the housing 100 as appropriate. For example, an image to be displayed on the display of the game system 1 can be displayed on an external display apparatus connected via the external terminal 78. Also, the electric conduction apparatus may be a power supply device for simply supplying power. The electric conduction apparatus according to the present disclosure can be used to supply power for various purposes other than charging an electronic device.

Thus, there is no particular limitation on the electrical structure within the housing 100. For example, the structure of the external terminal 78 is not particularly limited, and the external terminal 78 may also be various male terminals. Also, there is no particular limitation on the position and the shape of the second substrate 781. Also, the housing may be constituted by only the first substrate 1231 and the FFC 79, and the external terminal 78 and the FFC 79 may also be connected to each other. Also, if the position at which the FFC and the first substrate are connected to each other is located in the rear end portion as described above, it is advantageous, but may be another position. Further, a cable is not limited to the FFC 79, and a cable with various shapes may also be used.

(6) Also, the game system 1 described in the exemplary embodiment is an example, and may also be another game system. Also, power can be supplied to various electronic devices other than the game system. That is, an electronic device to which the present disclosure is applied need only have a predetermined surface provided with a connector insertion port, and is not particularly limited.

(7) The charging device 1000 of the exemplary embodiment can be used as an apparatus configured to support a device even though the connector support member 120 is detached, in addition to the electronic components such as the connector 122 and the substrate 1231. That is, the charging device 1000 can be used as an apparatus configured to support various devices as long as it has at least the above-described housing 100, stand member 130, and linking mechanism. In this case, the stand member 130 is configured to separate when attempts are made to forcibly detach the stand member 130, and thus the apparatus can be used as a supporting apparatus having an advantage capable of reducing the possibility that the stand member 130 will be damaged. In this case, a device that is supported by the supporting apparatus may not be an electronic device, and various devices can be supported. The supporting apparatus can be expressed as follows, for example.

This supporting apparatus is a supporting apparatus configured to support a device, the supporting apparatus including:

a housing that has a front portion on which the device can be mounted, and a rear portion that is opposite to the front portion;

a stand member that is attached to the rear portion of the housing; and a linking mechanism configured to detachably link the stand member to the housing so as to pivot about an axis line extending horizontally, the linking mechanism being capable of adjusting an angle between the stand member and the housing, in which the linking mechanism is configured such that the stand member separates from the housing when the angle between the stand member and the housing is a predetermined angle or more.

According to this configuration, when attempts are made to forcibly increase the angle of the stand member with respect to the housing, for example, if the angle is the predetermined angle or more, the stand member separates from the housing, and thus it is possible to reduce the possibility that the stand member and the housing will be damaged. On the other hand, even though the stand member separates, the stand member may be then attached to the housing again and used.

(8) The configuration of the linking mechanism is not particularly limited, and the linking mechanism need only be configured such that the stand member 130 pivots with respect to the housing 100 and separates therefrom when the angle between the stand member 130 and the housing 100 is the predetermined angle or more.

LIST OF REFERENCE NUMERALS

1 Game system (electronic device)
27 Female connector (connector insertion port)
29 Groove (recessed portion)
71 Base portion 711 Upper surface (support surface or surface of base portion)
72 Extension portion
75 Support member (first site)
76 Torque hinge (hinge portion)
77 Pivoting member (second site)
100 Housing
120 Connector support member (pivoting mechanism)
130 Stand member
122 Connector
1231 First substrate (substrate)
128 Spring (elastic member)
1291 Facing surface
141 Fixing piece (fixing portion)
144 Protruding piece (engagement portion)
79 Flexible flat cable (cable)

What is claimed is:

1. An electric conduction apparatus that supports an electronic device having a predetermined surface provided with a connector insertion port and is capable of being electrically connected to the electronic device, having a back surface that extends from a rear end of the predetermined surface, and having a recessed portion extending upward from a portion at which the predetermined surface and the back surface intersect with each other, the electric conduction apparatus comprising:
    a housing having a front side and a rear side;
    a connector that protrudes from the housing and is configured to be inserted into the connector insertion port; and
    a pivoting mechanism configured to pivot the connector about a first axis located on the rear side relative to the connector, wherein
    the pivoting mechanism includes a facing surface configured to face the back surface of the electronic device when the connector is inserted into the connector insertion port of the electronic device,
    the facing surface is disposed on the rear side relative to the connector and extends substantially parallel to a direction in which the connector protrudes, and
    the pivoting mechanism includes a guide portion at least a portion of which can be inserted into the recessed portion, the guide portion protruding from the facing surface toward the front side.

2. The electric conduction apparatus according to claim 1, wherein the facing surface is pivotable by the pivoting mechanism together with the connector.

3. The electric conduction apparatus according to claim 1, wherein the electronic device has a recessed portion extending upward from a portion at which the predetermined surface and the back surface intersect with each other, and
    the pivoting mechanism includes a guide portion at least a portion of which can be inserted into the recessed portion, the guide portion including the facing surface.

4. The electric conduction apparatus according to claim 1, further comprising:
    a substrate that is electrically connected to the connector; and
    a cable extending from a rear end portion of the substrate on the rear side,
    wherein the substrate is supported by the pivoting mechanism to be pivotable together with the connector, and
    the first axis is located in a vicinity of the rear end portion of the substrate.

5. The electric conduction apparatus according to claim 1, wherein the pivoting mechanism includes an elastic member that biases the connector in a direction in which the connector is inserted into the connector insertion port.

6. The electric conduction apparatus according to claim 1, wherein the electronic device has a front surface extending from a front end of the predetermined surface,
    the housing has a support surface that faces the predetermined surface of the electronic device, and
    the support surface is configured such that a portion at which the predetermined surface and the front surface of the electronic device intersect with each other comes into contact with the support surface when the connector inserted into the connector insertion port is detached from the connector insertion port due to tilting the electronic device towards the front side.

7. The electric conduction apparatus according to claim 1, wherein the housing has
    a base portion having a surface that is configured to face the predetermined surface of the electronic device when the connector is inserted into the connector insertion port, and
    an extension portion having a front surface that extends from the surface of the base portion, wherein
    the base portion and the extension portion intersect with each other in a side view, and
    the connector is disposed completely on a housing side of a virtual plane that connects a front end of the surface of the base portion and an upper end of the front surface.

8. The electric conduction apparatus according to claim 7, wherein the base portion and the extension portion form an L-shape in a side view.

9. The electric conduction apparatus according to claim 1, wherein the housing has
    a base portion having a surface that is configured to face the predetermined surface of the electronic device when the connector is inserted into the connector insertion port, and
    an extension portion that has a front surface extending from the surface of the base portion, and a back surface that is opposite to the front surface,
    the electric conduction apparatus further comprising:
    a stand member that is attached to the back surface of the extension portion; and
    a linking mechanism linking the stand member to the housing so as to be capable of pivoting about a second axis, the linking mechanism allowing adjustment of an angle between the stand member and the housing.

10. The electric conduction apparatus according to claim 9, wherein the linking mechanism detachably links the stand member and the housing together, and
    the linking mechanism is configured to separate the stand member from the housing when the angle between the stand member and the housing is a predetermined angle or more.

11. The electric conduction apparatus according to claim 10, wherein, when the angle between the stand member and the housing is the predetermined angle, a portion of the stand member above the second axis comes into contact with the housing.

12. The electric conduction apparatus according to claim 9,
wherein the linking mechanism includes
a linking portion provided in the housing, and
a pair of fixing portions that are provided in the stand member and detachably fixed to the linking portion so as to sandwich two ends of the linking portion in a direction along the second axis.

13. The electric conduction apparatus according to claim 12,
wherein the linking mechanism further includes an engagement portion that is provided between the pair of fixing portions of the stand member and engaged with the linking portion.

14. The electric conduction apparatus according to claim 12, further comprising
an inclined portion in at least one of portions at which the fixing portions and the linking portion are in contact with each other in a state where the fixing portions and the linking portion are fixed to each other, wherein
the fixing portions and the linking portion are configured to be fixed to each other after sliding over the inclined portion.

15. The electric conduction apparatus according to claim 12,
wherein the linking mechanism includes
a first site that is provided in the extension portion,
a second site that has the linking portion, and
a hinge portion that links the first site and the second site and enables the first site and the second site to pivot relative to each other about the second axis.

16. The electric conduction apparatus according to claim 15,
wherein a material for forming the first site and the second site has a rigidity that is higher than that of a material for forming the housing.

17. The electric conduction apparatus according to claim 16,
wherein the first site and the second site are made of a resin material containing glass fibers, and at least a portion of the first site and the second site is accommodated in the housing.

18. The electric conduction apparatus according to claim 1,
wherein the electronic device can be charged when the connector is inserted into the connector insertion port of the electronic device.

19. An electric conduction apparatus that supports an electronic device having a predetermined surface provided with a connector insertion port and is capable of being electrically connected to the electronic device, having a back surface that extends from a rear end of the predetermined surface, and having a recessed portion extending upward from a portion at which the predetermined surface and the back surface intersect with each other, the electric conduction apparatus comprising:
a housing having a front side and a rear side;
a connector that protrudes from the housing and is configured to be inserted into the connector insertion port; and
a pivoting mechanism configured to pivot the connector about a first axis located on the rear side relative to the connector, wherein
the pivoting mechanism includes a facing surface configured to face the back surface of the electronic device when the connector is inserted into the connector insertion port of the electronic device, and the facing surface is disposed on the rear side relative to the connector and extends substantially parallel to a direction in which the connector protrudes, and
the pivoting mechanism includes a guide portion at least a portion of which can be inserted into the recessed portion, the guide portion including the facing surface.

20. An electric conduction apparatus that supports an electronic device having a predetermined surface provided with a connector insertion port and is capable of being electrically connected to the electronic device, the electric conduction apparatus comprising:
a connector configured to be inserted into the connector insertion port;
a housing from which the connector protrudes, the housing having
a front side,
a rear side,
a base portion having a surface that is configured to face the predetermined surface of the electronic device when the connector is inserted into the connector insertion port, and
an extension portion that has a front surface extending from the surface of the base portion, and a back surface that is opposite to the front surface;
a pivoting mechanism configured to pivot the connector about a first axis located on the rear side relative to the connector;
a stand member that is attached to the back surface of the extension portion; and
a linking mechanism linking the stand member to the housing so as to be capable of pivoting about a second axis, the linking mechanism allowing adjustment of an angle between the stand member and the housing.

* * * * *